US012339006B1

(12) United States Patent
Naik et al.

(10) Patent No.: US 12,339,006 B1
(45) Date of Patent: Jun. 24, 2025

(54) TURBINE ENGINE HAVING A COMBUSTION SECTION WITH A FUEL NOZZLE ASSEMBLY

(71) Applicant: GENERAL ELECTRIC COMPANY, Schenectady, NY (US)

(72) Inventors: Pradeep Naik, Bengaluru (IN); Clayton Stuart Cooper, Loveland, OH (US); Sibtosh Pal, Mason, OH (US); Michael T. Bucaro, Arvada, CO (US); Michael A. Benjamin, Cincinnati, OH (US); Steven C. Vise, Loveland, OH (US); Karthikeyan Sampath, Bengaluru (IN); Andrew Joseph Wickersham, Liberty Township, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/394,407

(22) Filed: Dec. 22, 2023

(51) Int. Cl.
*F23R 3/12* (2006.01)
*F02C 3/22* (2006.01)
*F23R 3/04* (2006.01)
*F23R 3/28* (2006.01)

(52) U.S. Cl.
CPC ............... *F23R 3/286* (2013.01); *F02C 3/22* (2013.01); *F23R 3/045* (2013.01); *F23R 3/12* (2013.01)

(58) Field of Classification Search
CPC .... F23R 3/045; F23R 3/12; F23R 3/14; F23R 3/286; F23R 3/36; F02C 3/22
See application file for complete search history.

(56) References Cited

U.S. PATENT DOCUMENTS

| 4,408,461 | A  | 10/1983 | Bruhwiler et al. |
| 5,315,815 | A  | 5/1994  | McVey |
| 5,433,596 | A  | 7/1995  | Doebbeling |
| 5,836,164 | A  | 11/1998 | Tsukahara et al. |
| 6,367,262 | B1 | 4/2002  | Mongia et al. |
| 7,017,329 | B2 | 3/2006  | Farhangi et al. |
| 7,093,438 | B2 | 8/2006  | Dinu et al. |
| 7,343,745 | B2 | 3/2008  | Inoue et al. |
| 7,824,165 | B2 | 11/2010 | Davie et al. |
| 8,205,452 | B2 | 6/2012  | Boardman et al. |
| 8,230,687 | B2 | 7/2012  | Ziminsky |

(Continued)

FOREIGN PATENT DOCUMENTS

| CN | 110939530 A | 3/2020 |
| CN | 111520763 B | 6/2022 |

(Continued)

OTHER PUBLICATIONS

Samimy et al., Effect of Tabs on the Flow and Noise Field of an Axisymmetric Jet, AIAA Journal vol. 31, No. 4, Apr. 1993, pp. 609-619.*

*Primary Examiner* — William H Rodriguez
(74) *Attorney, Agent, or Firm* — McGarry Bair PC

(57) ABSTRACT

A turbine engine has a compression section, a combustion section, and a turbine section in serial flow arrangement. The combustion section has a combustion liner and dome wall collectively forming at least a portion of a combustion chamber. The combustion section has a fuel nozzle assembly. The fuel nozzle assembly has a compressed air tube, and a body. The body defining a gaseous fuel channel exhausting into the combustion chamber.

20 Claims, 16 Drawing Sheets

(56) References Cited

U.S. PATENT DOCUMENTS

| | | |
|---|---|---|
| 8,266,911 B2 | 9/2012 | Evulet |
| 8,875,516 B2 | 11/2014 | Uhm et al. |
| 8,955,329 B2 | 2/2015 | Popovic et al. |
| 10,865,989 B2 | 12/2020 | Sadasivuni |
| 11,054,137 B2 | 7/2021 | Choi |
| 11,085,643 B2 | 8/2021 | Freeman et al. |
| 11,454,396 B1* | 9/2022 | Boardman .............. F23R 3/286 |
| 2008/0078160 A1 | 4/2008 | Kraemer |
| 2010/0031661 A1 | 2/2010 | Varatharajan |
| 2010/0162716 A1 | 7/2010 | Bastnagel et al. |
| 2010/0275604 A1 | 11/2010 | Hall |
| 2010/0300102 A1 | 12/2010 | Bathina et al. |
| 2011/0162379 A1 | 7/2011 | Baruah et al. |
| 2011/0185703 A1 | 8/2011 | Dodo et al. |
| 2012/0151928 A1 | 6/2012 | Patel et al. |
| 2014/0109582 A1 | 4/2014 | Shershnyov et al. |
| 2016/0010864 A1 | 1/2016 | Abe et al. |
| 2016/0290646 A1 | 10/2016 | Abe et al. |
| 2017/0108224 A1 | 4/2017 | Beck |
| 2018/0266692 A1* | 9/2018 | Patel ......................... F23R 3/28 |
| 2019/0137103 A1 | 5/2019 | Choi |
| 2021/0301722 A1 | 9/2021 | Ziminsky et al. |
| 2022/0333781 A1* | 10/2022 | Chandra ................... F23R 3/14 |
| 2022/0364729 A1 | 11/2022 | Singh et al. |
| 2023/0204213 A1 | 6/2023 | Naik et al. |
| 2023/0250958 A1 | 8/2023 | Jeong et al. |
| 2024/0183536 A1* | 6/2024 | Bucaro ................ F23D 11/107 |

FOREIGN PATENT DOCUMENTS

| | | |
|---|---|---|
| CN | 116293800 A | 6/2023 |
| DE | 920720 | 11/1954 |
| WO | 2013065624 A1 | 5/2013 |

* cited by examiner

_TURBINE ENGINE HAVING A COMBUSTION SECTION WITH A FUEL NOZZLE ASSEMBLY_

TECHNICAL FIELD

The present subject matter relates generally to a turbine engine, and more specifically to a turbine engine having a combustion section including a fuel nozzle assembly.

BACKGROUND

Turbine engines are driven by a flow of combustion gases passing through the engine to rotate a multitude of turbine blades, which, in turn, rotate a compressor to provide compressed air to the combustor for combustion. A combustor can be provided within the turbine engine and is fluidly coupled with a turbine into which the combusted gases flow.

The use of hydrocarbon fuels in the combustor of a turbine engine is known. Generally, air and fuel are fed to a combustion chamber, the air and fuel are mixed, and then the fuel is burned in the presence of the air to produce hot gas. The hot gas is then fed to a turbine where it cools and expands to produce power. By-products of the fuel combustion typically include environmentally unwanted byproducts, such as nitrogen oxide and nitrogen dioxide (collectively called $NO_x$), carbon monoxide (CO), unburned hydrocarbon (UHC) (e.g., methane and volatile organic compounds that contribute to the formation of atmospheric ozone), and other oxides, including oxides of sulfur (e.g., $SO_2$ and $SO_3$).

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
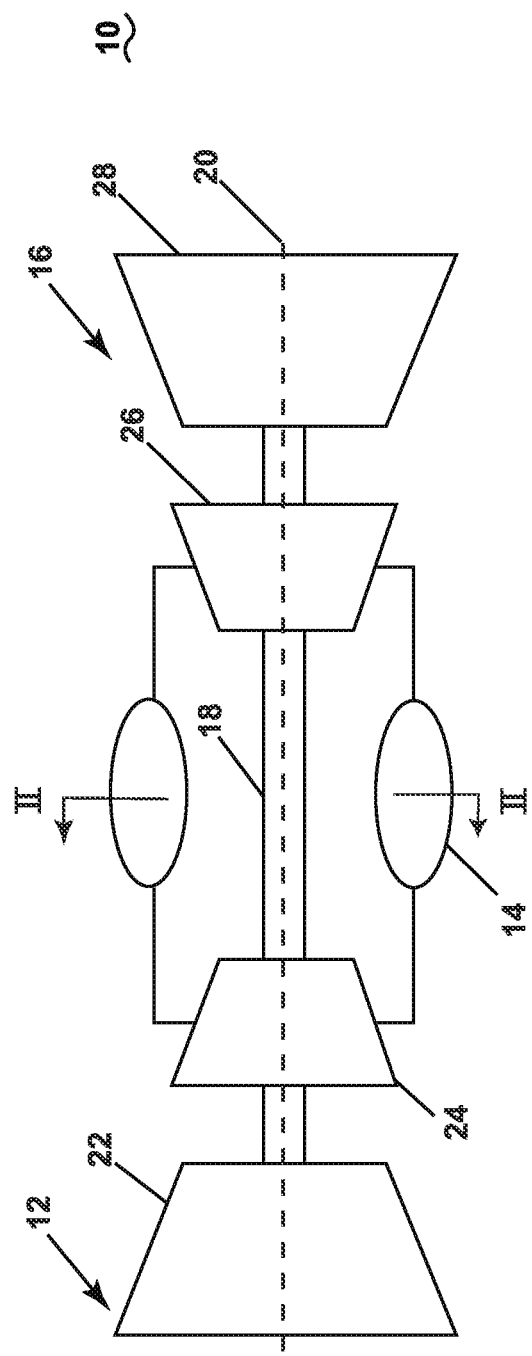
FIG. 1 is a schematic representation of a turbine engine, the turbine engine including a compression section, a combustion section, and a turbine section.

Aspects of the disclosure described herein are directed to a turbine engine including a combustion section including a fuel nozzle assembly. The fuel nozzle assembly includes a fuel nozzle terminating at a set of gaseous fuel orifices. The fuel nozzle assembly includes a set of compressed air tubes. A set of vortex generators are provided within at least one of the compressed air tubes of the set of compressed air tubes.

The fuel nozzle assembly is especially well adapted for the use of hydrogen fuel (hereinafter, "H2 fuel"). Specifically, the fuel nozzle assembly is especially well adapted to feed a flow of gaseous H2 fuel to the combustion chamber. H2 fuels, when compared to traditional fuels (e.g., carbon fuels, petroleum fuels, etc.), have a higher burn temperature and velocity. Further, flashback can occur when using H2 fuels. As used herein, flashback refers to unintended flame propagation when the H2 fuel is combusted. H2 fuel has higher volatility, meaning that once the H2 fuel is combusted or ignited, the flame generated by the ignition of the H2 fuel can expand in undesired location; in other words, flashback can occur. For example, the flame can expand into the fuel nozzle assembly or igniter. The fuel nozzle assembly, as described herein, ensures flashback of the H2 fuel does not occur. Auto-ignition of the H2 fuel can occur if the H2 fuel is too hot. Auto-ignition of the H2 fuel can be undesirable in certain locations of the combustion section. The fuel nozzle assembly as described herein ensures that the temperature of the H2 fuel is below the auto-ignition temperature until at least when it is desired to ignite the H2 fuel.

As used herein, the term "gaseous fuel" or iterations thereof refers to a combustible fuel in a gaseous state. It will be appreciated that gaseous fuel is different from atomized fuel. Atomized fuel utilizes an impeller, orifices, or the like to take a liquid fuel and atomize the liquid fuel into very small droplets.

In some aspects, the gaseous fuel exits the fuel nozzle with a given speed and then mixes with air for combustion. As the fuel/air mixture burns, the flame propagates upstream. It can be desirable to control or maintain a constant flame in the combustor for ignition of subsequent fuel, and not to continually ignite the fuel with an ignitor.

For purposes of illustration, the present disclosure will be described with respect to a turbine engine (gas turbine engine). It will be understood, however, that aspects of the disclosure described herein are not so limited and that a fuel nozzle assembly as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first" and "second" may be used interchangeably to distinguish one component from another and are not intended to signify location or importance of the individual components.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

FIG. 1 is a schematic view of a turbine engine 10. As a non-limiting example, the turbine engine 10 can be used within an aircraft. The turbine engine 10 can include, at least, a compression section 12, a combustion section 14, and a turbine section 16 in serial flow arrangement. A drive shaft 18 rotationally couples the compression section 12 and the turbine section 16, such that rotation of one affects the rotation of the other, and defines a rotational axis or engine centerline 20 for the turbine engine 10.

The compression section 12 can include a low-pressure (LP) compressor 22, and a high-pressure (HP) compressor 24 serially fluidly coupled to one another. The turbine section 16 can include an LP turbine 26, and an HP turbine 28 serially fluidly coupled to one another. The drive shaft 18 can operatively couple the LP compressor 22, the HP compressor 24, the LP turbine 26 and the HP turbine 28 together. Alternatively, the drive shaft 18 can include an LP drive shaft (not illustrated) and an HP drive shaft (not illustrated). The LP drive shaft can couple the LP compressor 22 to the LP turbine 26, and the HP drive shaft can couple the HP compressor 24 to the HP turbine 28. An LP spool can be defined as the combination of the LP compressor 22, the LP turbine 26, and the LP drive shaft such that the rotation of the LP turbine 26 can apply a driving force to the LP drive shaft, which in turn can rotate the LP compressor 22. An HP spool can be defined as the combination of the HP compressor 24, the HP turbine 28, and the HP drive shaft such that the rotation of the HP turbine 28 can apply a driving force to the HP drive shaft which in turn can rotate the HP compressor 24.

The compression section 12 can include a plurality of axially spaced stages. Each stage includes a set of circumferentially-spaced rotating blades and a set of circumferentially-spaced stationary vanes. The compressor blades for a stage of the compression section 12 can be mounted to a disk, which is mounted to the drive shaft 18. Each set of blades for a given stage can have its own disk. The vanes of the compression section 12 can be mounted to a casing which can extend circumferentially about the turbine engine 10. It will be appreciated that the representation of the compression section 12 is merely schematic and that there can be any number of stages. Further, it is contemplated, that there can be any other number of components within the compression section 12.

Similar to the compression section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section 16 can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 can be provided serially between the compression section 12 and the turbine section 16. The combustion section 14 can be fluidly coupled to at least a portion of the compression section 12 and the turbine section 16 such that the combustion section 14 at least partially fluidly couples the compression section 12 to the turbine section 16. As a non-limiting example, the combustion section 14 can be fluidly coupled to the HP compressor 24 at an upstream end of the combustion section 14 and to the HP turbine 28 at a downstream end of the combustion section 14.

During operation of the turbine engine 10, ambient or atmospheric air is drawn into the compression section 12 via a fan (not illustrated) upstream of the compression section 12, where the air is compressed defining a compressed air. The compressed air can then flow into the combustion section 14 where the compressed air is mixed with fuel and ignited, thereby generating combustion gases. Some work is extracted from these combustion gases by the HP turbine 28, which drives the HP compressor 24. The combustion gases are discharged into the LP turbine 26, which extracts additional work to drive the LP compressor 22, and the exhaust gas is ultimately discharged from the turbine engine 10 via an exhaust section (not illustrated) downstream of the turbine section 16. The driving of the LP turbine 26 drives the LP spool to rotate the fan (not illustrated) and the LP compressor 22. The compressed airflow and the combustion gases can together define a working airflow that flows through the fan, compression section 12, combustion section 14, and turbine section 16 of the turbine engine 10.

Figure 2:
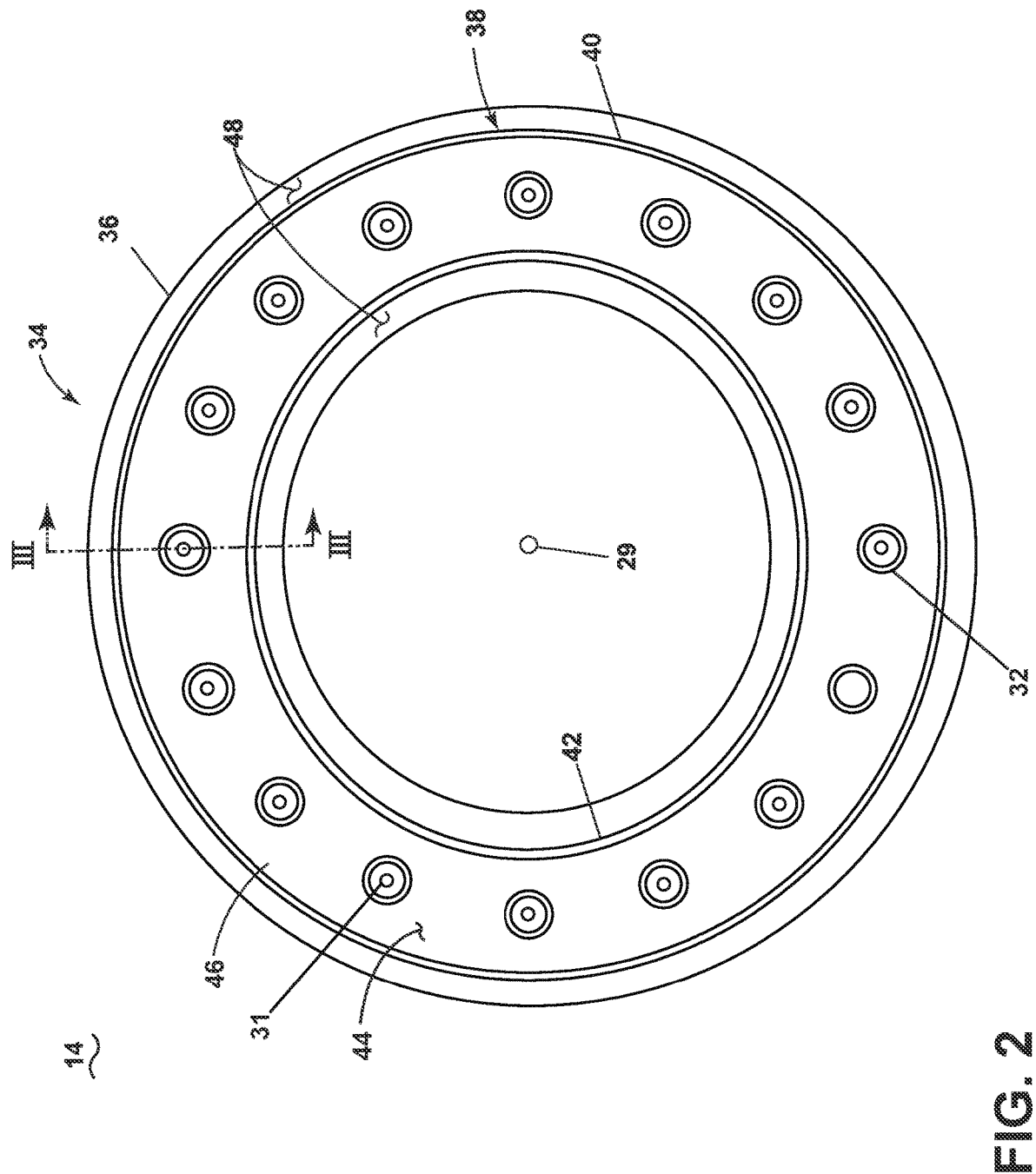
FIG. 2 depicts a cross-section view of the combustion section taken along line II-II of FIG. 1, further illustrating a set of fuel nozzle assemblies.

FIG. 2 depicts a cross-sectional view of the combustion section 14 along line II-II of FIG. 1. For purposes of illustration, the drive shaft 18 (FIG. 1) has been removed. The combustion section 14 includes a combustor 34. The combustor 34 includes a dome wall 44 including a set of fuel nozzle openings (not illustrated). The combustor 34 includes a set of fuel nozzle assemblies 32 extending through the set of fuel nozzle openings. The set of fuel nozzle assemblies 32 annularly arranged about a combustor centerline 29. The combustor centerline 29 can be the engine centerline 20 (FIG. 1) of the turbine engine 10 (FIG. 1). Additionally, or alternatively, the combustor centerline 29 can be a centerline for the combustion section 14, a single combustor, or a set of combustors that are arranged about the combustor centerline 29.

The set of fuel nozzle assemblies 32 are arranged about the combustor centerline 29. Each fuel nozzle of the set of fuel nozzle assemblies 32 includes a fuel nozzle centerline 31. The set of fuel nozzle assemblies 32 can include rich cups, lean cups, or a combination of both rich and lean cups annularly provided about the engine centerline 20 (FIG. 1). The combustor 34 is defined by a combustor liner 38. The combustor 34 can have a can, can-annular, or annular arrangement depending on the type of engine in which the combustor 34 is located. In a non-limiting example, the combustor 34 can have a combination arrangement as further described herein located within a casing 36 of the engine. The combustor liner 38, as illustrated by way of example, can be annular. The combustor liner 38 can include an outer combustor liner 40 and an inner combustor liner 42 concentric with respect to each other and annular about the engine centerline 20. The combustor liner 38 further defines the set of fuel nozzle assemblies 32. The dome wall 44 together with the combustor liner 38 can define a combustion chamber 46 annular about the engine centerline 20. The set of fuel nozzle assemblies 32 can be fluidly coupled to the combustion chamber 46. A compressed air passageway 48 can be defined at least in part by both the combustor liner 38 and the casing 36. Each fuel nozzle of the set of fuel nozzle assemblies 32 is defined by a discrete body extending through a respective portion of the dome wall 44 and being configured to exhaust a flow of gaseous fuel and compressed air into the combustion chamber 46.

Figure 3:
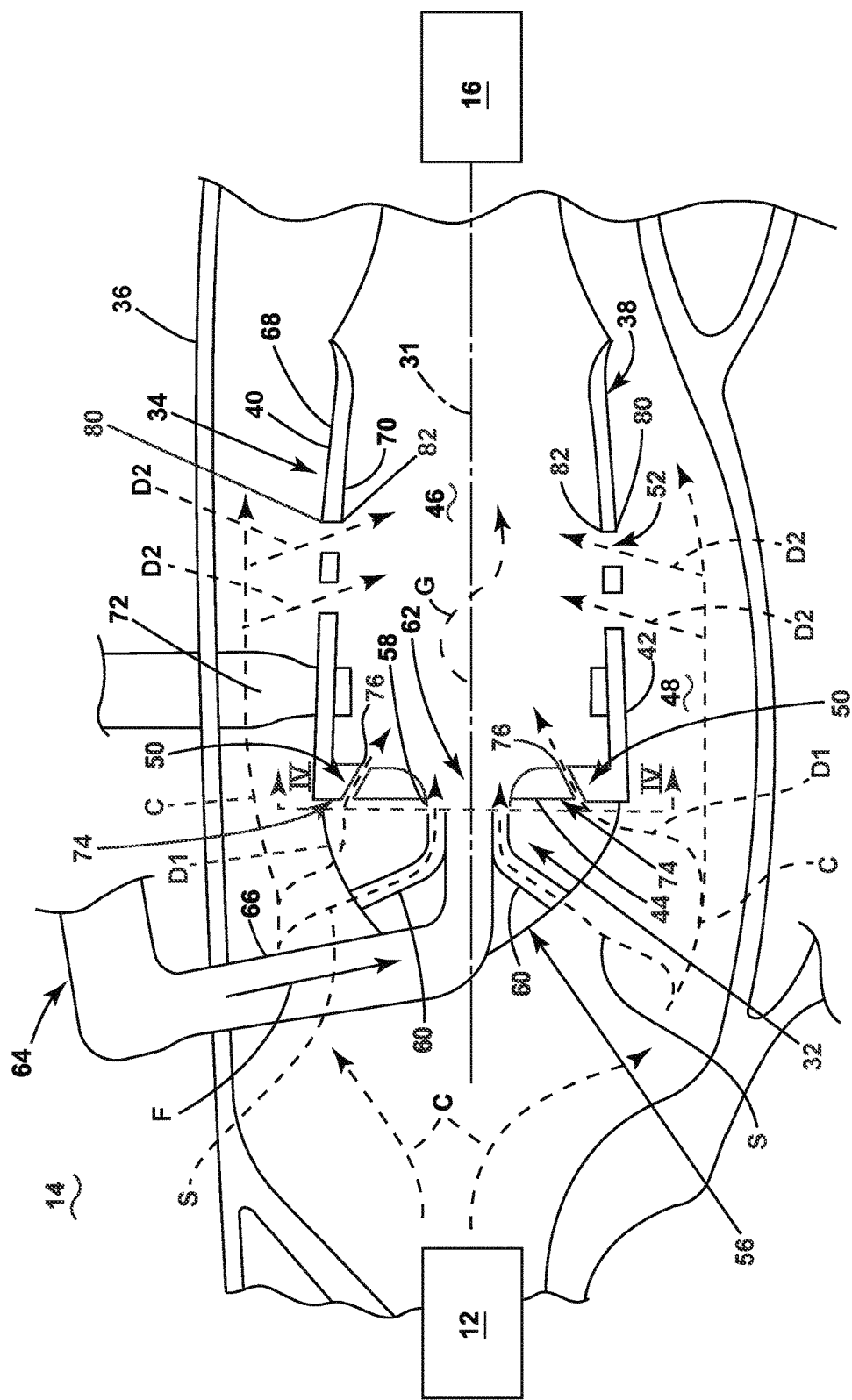
FIG. 3 is a schematic of a side cross-sectional view taken along line III-III of FIG. 2, further illustrating a fuel nozzle assembly exhausting into a combustion chamber.

FIG. 3 depicts a cross-section view taken along line III-III of FIG. 2 illustrating the combustion section 14. At least one flame shaping passage can fluidly connect compressed air and the combustion chamber 46. By way of example, the at least one flame shaping passage is illustrated as first set of flame shaping holes 50 or second first set of flame shaping holes 52. The combustor 34 can include the first set of flame shaping holes 50, the second first set of flame shaping holes 52, or both the first set of flame shaping holes 50 and the second first set of flame shaping holes 52.

The first set of flame shaping holes 50 can pass through the dome wall 44, fluidly coupling compressed air from the compression section 12 or the compressed air passageway 48 to the combustion chamber 46.

The second first set of flame shaping holes 52 can pass through the combustor liner 38, fluidly coupling compressed air from the compressed air passageway 48 to the combustion chamber 46.

Each fuel nozzle assembly of the set of fuel nozzle assemblies 32 can be coupled to and disposed within a dome assembly 56. Each fuel nozzle assembly of the set of fuel nozzle assemblies 32 can include a flare cone 58 and a swirler 60. The flare cone 58 includes an outlet 62 of the respective fuel nozzle assembly directly fluidly coupled to the combustion chamber 46. Each fuel nozzle assembly of the set of fuel nozzle assemblies 32 is fluidly coupled to a fuel inlet 64 via a passageway 66. Each fuel nozzle assembly of the set of fuel nozzle assemblies 32 includes a fuel nozzle centerline 31.

Both the inner combustor liner 42 and the outer combustor liner 40 can have an outer surface 68 and an inner surface 70 at least partially defining the combustion chamber 46. The combustor liner 38 can be made of one continuous monolithic portion or be multiple monolithic portions assembled together to define the inner combustor liner 42 and the outer combustor liner 40. By way of non-limiting example, the outer surface 68 can define a first piece of the combustor liner 38 while the inner surface 70 can define a second piece of the combustor liner 38 that when assembled together form the combustor liner 38. As described herein, the combustor liner 38 includes the second first set of flame shaping holes 52. It is further contemplated that the combustor liner 38 can be any type of combustor liner 38, including but not limited to a single wall or a double walled liner or a tile liner. An ignitor 72 can be provided at the combustor liner 38 and fluidly coupled to the combustion chamber 46, at any location, by way of non-limiting example upstream of the second first set of flame shaping holes 52.

During operation, a compressed air (C) from a compressed air supply, such as the LP compressor 22 or the HP compressor 24 of FIG. 1, can flow from the compression section 12 to the combustor 34. A portion of the compressed air (C) can flow through the dome assembly 56. A first part of the compressed air (C) flowing through the dome assembly 56 can be fed to each fuel nozzle assembly of the set of fuel nozzle assemblies 32 via the swirler 60 as a swirled airflow (S). A flow of fuel (F) is fed to each fuel nozzle assembly of the set of fuel nozzle assemblies 32 via the fuel inlet 64 and the passageway 66. The swirled airflow (S) and the flow of fuel (F) are mixed at the flare cone 58 and fed to the combustion chamber 46 as a fuel/air mixture. The ignitor 72 can ignite the fuel/air mixture to define a flame within the combustion chamber 46, which generates a combustion gas (G). While shown as starting axially downstream of the outlet 62, it will be appreciated that the fuel/air mixture can be ignited at or near the outlet 62.

A second part of the compressed air (C) flowing through one or more portions of the dome assembly 56 can be fed to the first set of flame shaping holes 50 as a first flame shaping airflow (D1). That is, a portion of the compressed air (C) from the compression section 12 can flow through the dome wall 44 and into the combustion chamber 46 by passing through the first set of flame shaping holes 50. An inlet 74 is defined by a portion of one or more flame shaping holes of the first set of flame shaping holes 50. The inlet 74 is fluidly coupled to the compressed air (C). The first flame shaping airflow (D1) enters the one or more flame shaping holes of the first set of flame shaping holes 50 at the inlet 74 and exits the one or more flame shaping holes of the first set of flame shaping holes 50 at an outlet 76 located at the dome wall 44.

Another portion of the compressed air (C) can flow through the compressed air passageway 48 and can be fed to the second first set of flame shaping holes 52 as a second flame shaping airflow (D2). In other words, another portion of the compressed air (C) can flow axially past the dome assembly 56 and enter the combustion chamber 46 by passing through the second first set of flame shaping holes 52. That is, compressed air (C) can flow through the combustor liner 38 and into the combustion chamber 46 by passing through the second first set of flame shaping holes 52.

The first flame shaping airflow (D1) can be used to direct and shape the flame. The second flame shaping airflow (D2) can be used to direct the combustion gas (G). In other words, the first set of flame shaping holes 50 or the second first set of flame shaping holes 52 extending through the dome wall 44 or the combustor liner 38 direct air into the combustion chamber 46, where the directed air is used to control, shape, cool, or otherwise contribute to the combustion process in the combustion chamber 46.

The combustor 34 shown in FIG. 3 is well suited for the use of a hydrogen-containing gas as the fuel because it helps contain the faster moving flame front associated with hydrogen fuel, as compared to traditional hydrocarbon fuels. However, the combustor 34 can be used with traditional hydrocarbon fuels.

Figure 4:
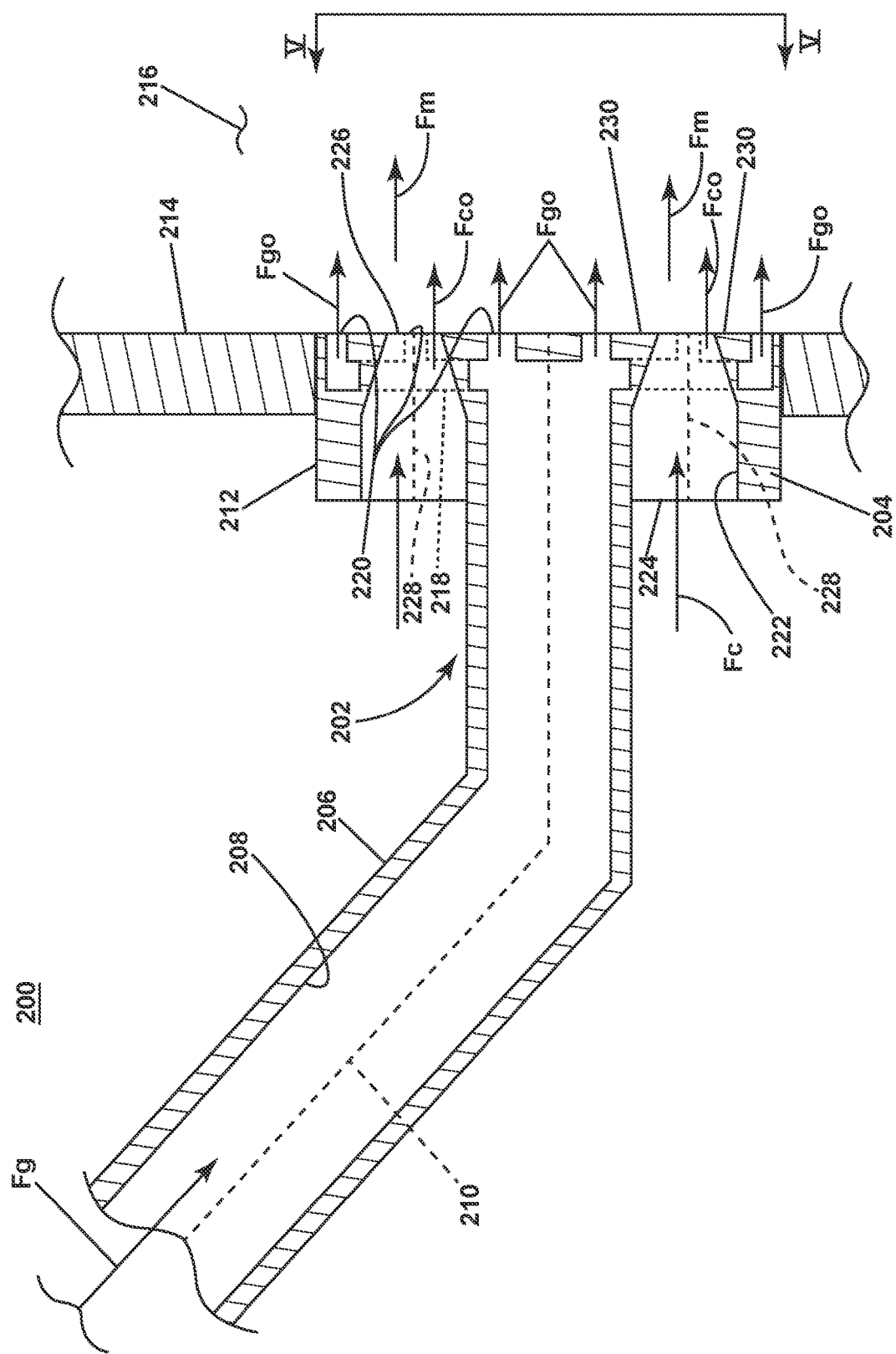
FIG. 4 is a schematic side cross-sectional view of a portion of a combustion section suitable for use as the combustion section of FIG. 1, the combustion section including a fuel nozzle assembly having a fuel nozzle terminating at a set of gaseous fuel orifices, a set of compressed air tubes, and a set of vortex generators.

FIG. 4 is a schematic side cross-sectional view of a portion of a combustion section 200 suitable for use as the combustion section 14 of FIG. 1. The combustion section 200 is similar to the combustion section 14; therefore, like parts will be identified with like names, with it being understood that the description of the combustion section 14 applies to the combustion section 200 unless noted otherwise.

The combustion section 200 includes a dome wall 214 at least partially defining a combustion chamber 216. The combustion chamber 216, like the combustion chamber 46 (FIG. 3), is further defined by a combustion liner (not illustrated) (e.g., the inner combustor liner 42 and the outer combustor liner 40 of FIG. 3). The combustion section 200 includes a fuel nozzle assembly 202. The fuel nozzle assembly 202 can be included within a set of fuel nozzle assemblies annularly arranged along the dome wall 214, like the set of fuel nozzle assemblies 32 of FIG. 2.

The fuel nozzle assembly 202 includes a fuel nozzle assembly 202 terminating at a set of gaseous fuel orifices 220, and a set of compressed air tubes 222. The fuel nozzle assembly 202 includes a body 206 having a head 204 and defining a gaseous fuel channel 208 and a centerline axis 210. The fuel nozzle assembly 202 is coupled to the dome wall 214 through any suitable method such has, but not limited to, adhesion, welding, bonding, fastening, frictional contact, or the like.

The head 204 is defined as a portion of the fuel nozzle assembly 202 that extends through a respective fuel nozzle assembly opening (not illustrated) provided along the dome wall 214. The head 204 includes a perimeter 212 that confronts the dome wall 214. At least a portion of the perimeter 212 can be radially spaced from or directly contact the dome wall 214.

The set of compressed air tubes 222 are provided at least partially within the head 204. Each compressed air tube of the set of compressed air tubes 222 includes a compressed air inlet 224 and a compressed air outlet 226 exhausting into the combustion chamber 216. The set of gaseous fuel orifices 220 are provided along the head 204 and exhausting into the combustion chamber 216. The gaseous fuel channel 208 can include a fuel manifold 218 provided within the head 204 that distributes a flow of fluid within the gaseous fuel channel 208 to the set of gaseous fuel orifices 220. The fuel manifold 218 can be defined by a series of channels extending through the head 204. The fuel manifold 218 can extend around the set of compressed air tubes 222. A portion of the gaseous fuel manifold 218 that extends around the set of compressed air tubes 222 is illustrated in phantom lines.

The set of compressed air tubes 222 can be integrally or non-integrally formed with the head 204. As a non-limiting example, the set of compressed air tubes 222 can be defined by channels cut out or otherwise formed within the body 206 of the fuel nozzle assembly 202. Alternatively, the set of compressed air tubes 222 can be defined by discrete bodies or tubes that are inserted into the fuel nozzle assembly 202. Each compressed air tube 222 defines a respective tube centerline axis 228. The compressed air inlet 224 is defined by a portion of the compressed air tube 222 provided within the head 204 that is axially farthest from the compressed air outlet 226, with respect to the tube centerline axis 228.

A set of vortex generators 230 are provided within the set of compressed air tubes 222. The set of vortex generators 230 are each defined as a structure extending radially from the body of the fuel nozzle assembly 202, or otherwise from outer limits of a respective compressed air tube of the set of compressed air tubes 222, and towards the tube centerline axis 228.

During operation, a flow of gaseous fuel (Fg) is fed to the gaseous fuel channel 208. The flow of gaseous fuel (Fg) flows through the gaseous fuel channel 208 and exhausted into the combustion chamber 216 through the set of gaseous fuel orifices 220 as an outlet flow of gaseous fuel (Fgo). The outlet flow of gaseous fuel (Fgo) can be ignited within the combustion chamber 216 or the fuel nozzle assembly 202 through an igniter (not illustrated) or by auto-ignition. The ignition of the outlet flow of gaseous fuel (Fgo) produces a flame within the combustion chamber 216. The flow of gaseous fuel (Fg) can contain 100% hydrogen ("H2") fuel or a mixture of hydrogen fuel and another gaseous fuel (e.g., methane). Alternatively, the flow of gaseous fuel (Fg) can be a mixture of H2 fuel and compressed air from, for example, the compression section (e.g., the compression section 12 of FIG. 1).

A flow of compressed air (Fc) (e.g., the compressed air (C) of FIG. 3) is fed to the set of compressed air tubes 222. The flow of compressed air (Fc) flows out from the compressed air outlet 226 as an outlet flow of compressed air (Fco). The outlet flow of compressed air (Fco) can be swirled or non-swirled. In the case of the outlet flow of compressed air (Fco) being swirled, the outlet flow of compressed air (Fco) includes a helical or otherwise swirled flow that flows into the combustion chamber 216. The amount of swirl to the outlet flow of compressed air (Fco), when swirled, can be quantified by a swirl number defined as an integral of the tangential momentum to the axial momentum of the flow of fluid downstream of a respective swirler. When swirled, the outlet flow of compressed air (Fco) has a swirl number of greater than or equal to 0.2 and less than or equal to 1.2. alternatively, the outlet flow of compressed air (Fco) can be non-swirled such that the swirl number is zero.

Each compressed air tube of the set of compressed air tubes 222 has a respective subset of the set of gaseous fuel orifices 220 that output the outlet flow of gaseous fuel (Fgo) near the respective compressed air tube 222. The outlet flow of compressed air (Fco) is used to capture or otherwise entrap at least a portion of the outlet flow of gaseous fuel (Fgo) exiting the gaseous fuel orifices 220 nearest the respective compressed air tube 222. The entrapment of the outlet flow of gaseous fuel (Fgo) by the outlet flow of compressed air (Fco) creates a mixed flow of gaseous fuel and air (Fm). The mixed flow of gaseous fuel and air (Fm) is subsequently ignited within the combustion chamber 216 to define a flame within the combustion chamber 216. As the set of compressed air tubes 222 can include a plurality of compressed air tubes, each fuel nozzle assembly 202 can include a plurality of discrete mixed flows of gaseous fuel and air (Fm) provided to the combustion chamber 216. The plurality of discrete mixed flows of gaseous fuel and air (Fm) is illustrated by the multiple instances of the mixed flow of gaseous fuel and air (Fm). The introduction of a plurality of discrete mixed flows of gaseous fuel and air (Fm) in turn means that each fuel nozzle assembly 202 can include multiple flames rather than just a single flame, like a conventional fuel nozzle assembly. It has been found that the use of multiple smaller flames rather than a single larger flame, per fuel nozzle assembly, reduces the overall $NO_x$ emissions from the combustion section 200.

The outlet flow of compressed air (Fco) is used to shape the flame (e.g., provide a desired footprint of the physical flame within the combustion chamber 216), and insulate various portions of the combustion section 200 from the flame. As a non-limiting example, the outlet flow of compressed air (Fco) causes the outlet flow of gaseous fuel (Fgo) to follow the path that the outlet flow of compressed air (Fco) follows. This, in turn, means that the flame that is generated by the ignition of the outlet flow of gaseous fuel (Fgo) follows the path that the outlet flow of compressed air (Fco) follows. In other words, the outlet flow of compressed air (Fco) shapes and directs the flame in a desired fashion. The outlet flow of compressed air (Fco) further insulates various portions of the combustion section 200 (e.g., the dome wall 214, the combustor liner 38 (FIG. 3), etc.) from the heat of the flame by providing a layer of insulation between the flame and other sections of the combustion section 200, cooling the other sections of the combustion section 200, or otherwise directing the flame away from the other sections of the combustion section 200. Further, the use of the plurality of discrete mixed flows of gaseous fuel and air (Fm) creating multiple smaller flames rather than a single larger flame, per fuel nozzle assembly 202, helps with flame shaping and insulative capabilities of the outlet flow of compressed air (Fco). As the fuel nozzle assembly 202 includes multiple smaller flames, the amount of compressed air that is needed to insulate the combustion section 200 from the flame and to effectively shape the flame is reduced when compared to the amount of compressed air required to insulate from and shape a single, larger flame.

While not illustrated, the combustion section 200 can include a controller module communicatively coupled to a set of valves in order to automatically control a flow of fluids to or within respective portions of the combustion section 200. As a non-limiting example, the controller module can automatically control a supply of the flow of gaseous fuel (Fg) to the gaseous fuel channel 208. As a non-limiting example, the controller module can automatically control a supply of the flow of compressed air (Fc) to one or more compressed air tubes of the set of compressed air tubes 222 As a non-limiting example, the controller module can automatically control a supply of the flow of gaseous fuel (Fg) to any one or more gaseous fuel orifices of the set of gaseous fuel orifices 220. The flow of gaseous fuel (Fg) and the flow of compressed air (Fc) can be controlled independently of one another. As a non-limiting example, a flow of compressed air can be shut off to one or more compressed air tubes of the set of compressed air tubes 222, while the flow of gaseous fuel (Fg) is fed to one or more gaseous fuel orifices of the set of gaseous fuel orifices 220.

The shaping of the flame and insulation between the flame and other portions of the combustion section 200 is especially important when utilizing a gaseous H2 fuel in comparison with traditional fuels. The gaseous H2 fuel has a higher burn temperature and tendency for flashback compared to the traditional fuels. As such, the outlet flow of compressed air (Fco) is used to push the flame away from the fuel nozzle assembly 202. The pushing of the outlet flow of gaseous fuel (Fgo) away from the fuel nozzle assembly 202 helps ensure that flashback into the fuel nozzle assembly 202 of the outlet flow of gaseous fuel (Fgo), once ignited, does not occur. The outlet flow of compressed air (Fco) further ensures that the flame, which burns hotter than a flame generated from the traditional fuels, does not overly heat sections of the combustion section 200. The outlet flow of compressed air (Fco) can further be used to create a uniform flame distribution at the combustor outlet. It is contemplated that a uniform flame distribution or temperature distribution at the combustor outlet results in a higher efficiency of the turbine section.

Figure 5:
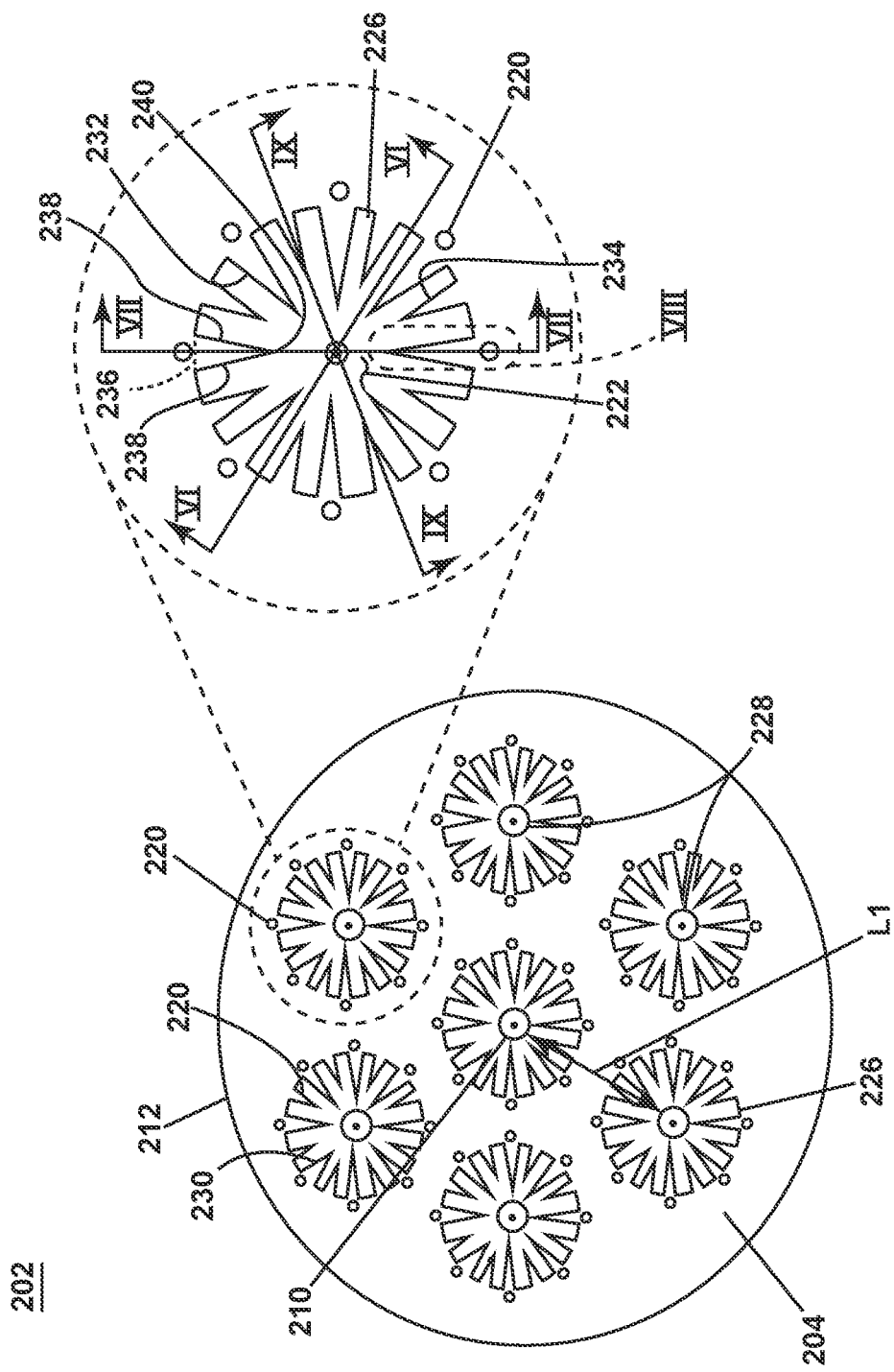
FIG. 5 is a schematic view of the fuel nozzle assembly viewed from sight line V-V of FIG. 4, further illustrating the set of vortex generators including a set of first vortex generators and a set of second vortex generators.

FIG. 5 is a schematic view of the combustion section 200 viewed from sight line V-V of FIG. 4. For purposes of illustration, the fuel nozzle assembly 202 is removed from the dome wall 214 (FIG. 4). The head 204 can take any suitable form. As a non-limiting example, the head 204 can be circular such that the perimeter 212 is defined by a circumference of a circle. As a non-limiting example, the head can be any suitable polygonal shape. The set of compressed air tubes 222 and the set of gaseous fuel orifices 220 are provided entirely within the confines of the perimeter 212.

There are any number of one or more compressed air tubes in the set of compressed air tubes 222. The set of compressed air tubes 222 can be evenly, or non-evenly spaced along the head 204. The fuel nozzle assembly 202 can be symmetric or asymmetric about a plane extending along the centerline axis 210 and intersecting the head 204. The placement of the set of compressed air tubes 222 can be symmetric or asymmetric about a plane extending along the centerline axis 210 and intersecting the head 204. Each compressed air tube of the set of compressed air tubes 222 can be symmetric or asymmetric about a plane extending along the tube centerline axis 228. The set of compressed air tubes 222 can include a compressed air tube that is aligned with the tube centerline axis 228. Put another way, the set of compressed air tubes 222 can include a respective compressed air tube having a tube centerline axis 228 that is aligned with the tube centerline axis 228, as illustrated. At least a portion of the set compressed air tubes 222 can be equal to or non-equal in size to each other.

Each compressed air tube of the set of compressed air tubes 222 is provided a first distance (L1) from a respective adjacent compressed air tube. The first distance (L1) is measured between the tube centerline axis 228 of adjacent compressed air tubes 222. The first distance (L1) between a first compressed air tube and a second compressed air tube adjacent to the first compressed air tube can be equal to or non-equal to the first distance (L1) between the first compressed air tube and a third compressed air tube, different from the second compressed air tube, adjacent to the first compressed air tube.

The set of gaseous fuel orifices 220 are provided circumferentially around the set of compressed air tubes 222, with respect to the tube centerline axis 228. As a non-limiting example, each compressed air tube of the set of compressed air tubes 222 can include a respective group of gaseous fuel orifices of the set of gaseous fuel orifices 220 arranged in a circle, or other polygonal shape, around the compressed air tube.

Each gaseous fuel orifice of the set of gaseous fuel orifices 220 can be circumferentially aligned, with respect to the tube centerline axis 228, with a respective vortex generator of the set of vortex generators 230 provided within a closest compressed air tube of the set of compressed air tubes 222.

Each vortex generator of the set of vortex generators 230 extends from a root 236 provided along the head 204 or otherwise confronting the head 204 and radially to an apex 240, with respect to a respective tube centerline axis 228 of the respective compressed air tube that the vortex generator is provided within. Each vortex generator of the set of vortex generators 230 includes a pair of opposing side walls that connect the root 236 and the apex 240.

The set of vortex generators 230 includes any suitable number of vortex generators. At least a portion of the vortex generators 230 can have a varying constructions. As a non-limiting example, the set of vortex generators 230 can include a set of first vortex generators 232 and a set of second vortex generators 234, with the set of first vortex generators 232 being different from the set of second vortex generators 234. It will be appreciated that all vortex generators of the set of vortex generators 230 can have the same formation, or that there can be any number of two or sets of vortex generators having differing constructions.

As a non-limiting example, the set of first vortex generators 232 can include a first polygonal shape, while the set of second vortex generators 234 include a second polygonal shape different from the first polygonal shape. The set of vortex generators 230 can be formed as any suitable polygonal shape when viewed along a plane perpendicular to the tube centerline axis 228 and intersecting the vortex generator. The polygonal shape can be, but is not limited to, a triangle, a rectangle, a rhombus, a hexagon, an ellipse, a semi-circle, or the like. As a non-limiting example, the set of gaseous fuel orifices 220 can be circumferentially aligned with the set of first vortex generators 232 and not the set of second vortex generators 234, or vice-versa.

Each compressed air tube of the set of compressed air tubes 222 can include the set of first vortex generators 232 and the set of second vortex generators 234. The set of first vortex generators 232 and the set of second vortex generators 234 can be alternately, or non-alternately spaced within the respective compressed air tube. The set of vortex generators 230 within a single compressed air tube 222 are evenly or non-evenly circumferentially spaced within the compressed air tube about the tube centerline axis 228.

Figure 6:
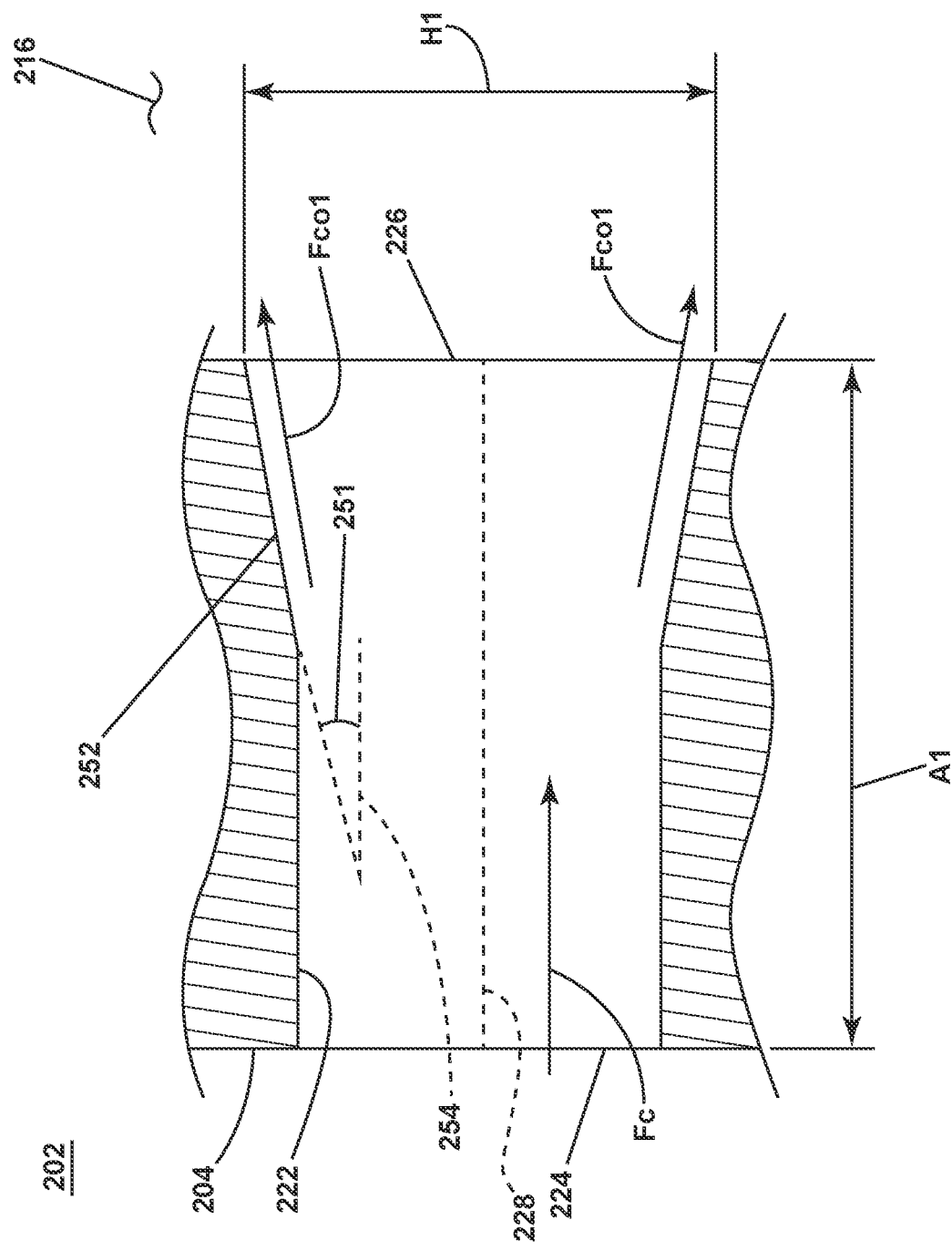
FIG. 6 is a schematic side cross-sectional view of a compressed air tube of the set of compressed air tubes taken along sectional line VI-VI of FIG. 5, further illustrating a portion of the compressed air tube without the set of vortex generators.

FIG. 6 is a schematic side cross-sectional view of a compressed air tube of the set of compressed air tubes 222 taken along sectional line VI-VI of FIG. 5. The compressed air tube 222 taken along sectional line VI-VI does not include the set of vortex generators 230. It will be appreciated that a vortex generator pair is formed between two vortex generators of the set of vortex generators 230 that are spaced on a radially opposing side of the compressed air tube 222 with respect to the tube centerline axis 228. In terms of a circular compressed air tube 222, the vortex generators in a vortex generator pair are spaced 180 degrees with respect to one another.

The compressed air tube 222 can include a surface 252 terminating at the compressed air outlet 226. At least a portion of the surface 252 can extend radially outward, with respect to the tube centerline axis 228, to define a flared surface, as illustrated. Alternatively, the surface 252 can extend constantly (no flare) or radially inward, with respect to the tube centerline axis 228, to define a tapered surface. The surface 252 can extend at a surface angle 251 with respect to a projection 254 of the tube centerline axis 228. The surface angle 251 can be constant or non-constant along the surface 252. The surface angle 251 has a value of greater than −60 degrees and less than or equal to 60 degrees.

During operation, the flow of compressed air (Fc) is fed to the compressed air tube 222. At least a portion of the flow of compressed air (Fc) follows the surface 252 where the set of vortex generators 230 are not present and flows out of the compressed air outlet 226 as a first outlet flow of compressed air (Fco1). The first outlet flow of compressed air (Fco1) forms a portion of the outlet flow of compressed air (Fco) of FIG. 4. The first outlet flow of compressed air (Fco1) follows the surface 252. As such, if the surface 252 flares radially outward, the first outlet flow of compressed air (Fco1) will follow the flared surface and enter the combustion chamber 216 directed radially outward from the tube centerline axis 228.

The compressed air tube 222 extends a first axial distance (A1), with respect to the tube centerline axis 228, between the compressed air inlet 224 and the compressed air outlet 226. The compressed air outlet 226 extends a first radial height (H1), with respect to the tube centerline axis 228, when viewed along a portion of the compressed air outlet 226 not including the set of vortex generators 230 (FIG. 4). The first radial height (H1) is defined as a maximum radial distance between opposing portions of the compressed air tube 222 along the compressed air outlet 226 regardless of the shape of the compressed air tube 222.

Figure 7:
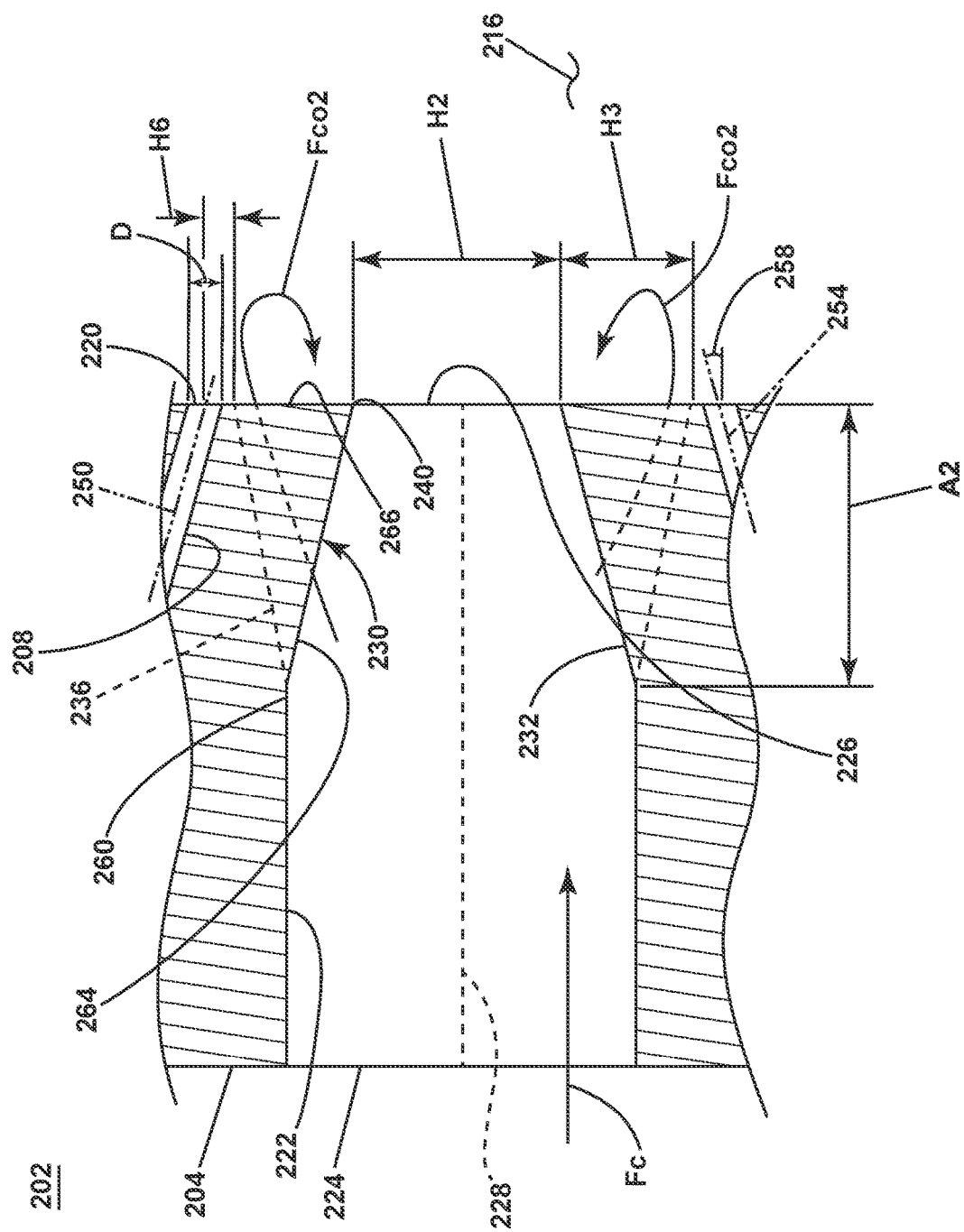
FIG. 7 is a schematic side cross-sectional view of the compressed air tube of the set of compressed air tubes taken along sectional line VII-VII of FIG. 5, further illustrating a portion of the compressed air tube including the set of first vortex generators.

FIG. 7 is a schematic side cross-sectional view of the compressed air tube 222 taken along sectional line VII-VII of FIG. 5. The compressed air tube 222 taken along sectional line VII-VII includes a portion of the set of vortex generators 230; specifically the set of first vortex generators 232.

The set of vortex generators 230 can be integrally formed with or coupled to the head 204 at the root 236, illustrated as a phantom line. The root 236 is defined as a portion of the set of vortex generators 230 that is aligned with the surface 252 (FIG. 6). In other words, if the vortex generator 230 were formed as a separate body and subsequently coupled to the head 204, the root 236 would extend along the surface 252. Each vortex generator of the set of vortex generators 230 includes a foot 260 defined as a portion of the vortex generator provided axially farthest from the compressed air outlet 226, with respect to the tube centerline axis 228. Each vortex generator of the set of vortex generators 230 includes a trailing edge 266, and a leading edge 264. At least a portion of the trailing edge 266 can be axially aligned with or offset from the compressed air outlet 226, with respect to the tube centerline axis 228.

The compressed air outlet 226 extends radially, with respect to the tube centerline axis 228, a second radial height (H2). The second radial height (H2) is measured between opposing apexes 240 of opposing first vortex generators of the set of first vortex generators 232. Each first vortex generator of the set of first vortex generators 232 extends radially, with respect to the tube centerline axis 228, a third radial height (H3). Each first vortex generator of the set of first vortex generators 232 extends axially, with respect to the tube centerline axis 228, a second axial distance (A2) between the foot 260 and the apex 240. The second radial height (H2) can be less than, equal to, or greater than the third radial height (H3). With reference to FIGS. 6 and 7, the second radial height (H2) is less than the first radial height (H1). In other words, the set of vortex generators 230 radially constrict the compressed air tube 222 at the compressed air outlet 226.

The gaseous fuel channel 208 defines a channel centerline axis 250 that branches off within the fuel manifold 218 (FIG. 4) and extends to each gaseous fuel orifice of the set of gaseous fuel orifices 220. An orifice angle 258 is formed between the channel centerline axis 250 at a respective gaseous fuel orifice of the set of gaseous fuel orifices 220 and the projection 254 of the tube centerline axis 228. The orifice angle 258 has a value of greater than or equal to −60 degrees and less than or equal to 60 degrees. As a non-limiting example, the orifice angle 258 of at least a portion of the set of gaseous fuel orifices 220 can be non-zero and oriented such that the outlet flow of gaseous fuel (Fgo) of FIG. 4 is directed radially toward the outlet flow of compressed air (Fco) of FIG. 4 exiting the compressed air outlet 226.

Each gaseous fuel orifice of the set of gaseous fuel orifices 220 is provided a sixth radial height (H6), with respect to the tube centerline axis 228, measured between where the channel centerline axis 250 intersects the gaseous fuel orifice and where the root 236 meets the trailing edge 266. Each gaseous fuel orifice of the set of gaseous fuel orifices 220 includes a respective radial width (D), with respect to the tube centerline axis 228. The gaseous fuel orifices 220 can be formed as circular holes, or any other polygonal shape. When formed as circular holes, the radial width (D) is a diameter. The radial width (D) is smaller than the sixth radial height (H6). As a non-limiting example, the sixth radial height (H6) is greater than or equal to 1.5 times and less than or equal to 20 times the radial width (D) (e.g., $1.5*D \leq H6 \leq 20*D$), During operation, the flow of compressed air (Fc) is fed to the compressed air tube 222. At least a portion of the flow of compressed air (Fc) flows over the set of first vortex generators 232 and out the compressed air outlet 226 as a second outlet flow of compressed air (Fco2). The second outlet flow of compressed air (Fco2) forms a portion of the outlet flow of compressed air (Fco) of FIG. 4. The set of vortex generators 230 are configured to direct the flow of compressed air (Fc) such that the second outlet flow of compressed air (Fco2) forms a vortex within the combustion chamber 216.

Figure 8:
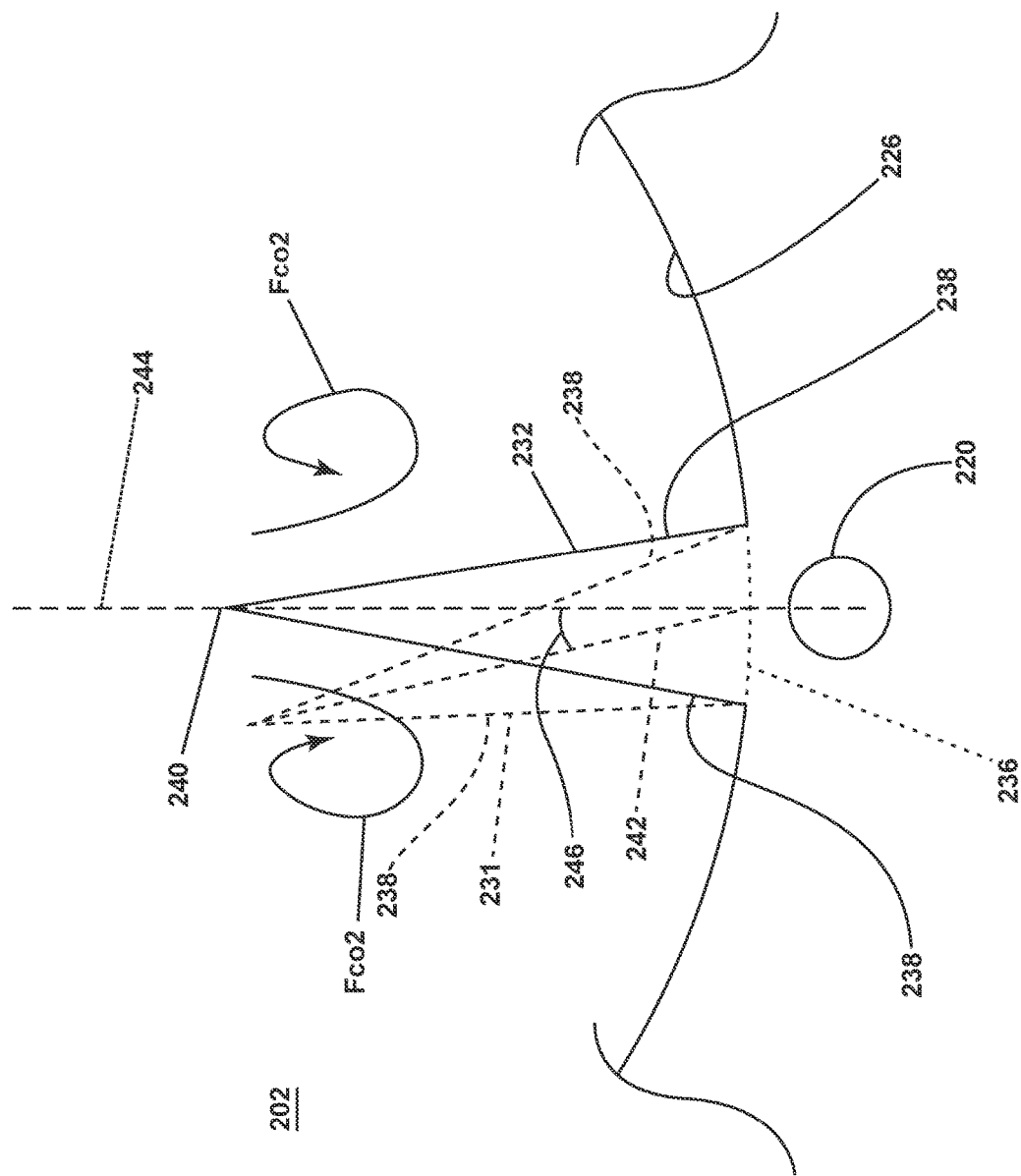
FIG. 8 is a schematic view of the fuel nozzle assembly as seen in section VIII of FIG. 5, further illustrating a vortex pair generator created by each vortex generator of the set of vortex generators.

FIG. 8 is a schematic view of the fuel nozzle assembly 202 as seen within section VIII of FIG. 5. While described in terms of the first vortex generator 232, it will be appreciated that the aspects of the first vortex generator 232 can be applied to any vortex generator of the set of vortex generators 230 of FIG. 5.

For purposes of illustration, an exemplary vortex generator 231 of the set of vortex generators 230 has been illustrated in phantom lines. A vortex generator centerline 242 extends from a midpoint provided along the base halfway between opposing side walls 238 to the apex 240. Each vortex generator of the set of vortex generators 230 is angled at an included angle 246 formed between a respective vortex generator centerline 242 and a radial line 244 extending radially outward from the respective tube centerline axis 228 of the respective compressed air tube that the vortex generator is provided within and intersecting the root 236 midway between the opposing side walls 238. For purposes of illustration, the radial line 244 has not been shown within the first vortex generator 232 as the radial line 244 corresponds to the vortex generator centerline 242 of the first vortex generator 232. The included angle 246 has a value of greater than or equal to −60 degrees and less than or equal to 60 degrees. As a non-limiting example, the included angle 246 of at least one vortex generator can be non-equal to 0 degrees. The exemplary vortex generator 231 includes a non-zero included angle 246, while the first vortex generator 232, as illustrated, includes an included angle 246 of zero.

During operation, each vortex generator of the set of vortex generators 230 creates two vortices defining a vortex pair provided on opposing sides of the opposing side walls 238. The two vortices generated by each vortex generator of the set of vortex generators 230 are defined as vortex pairs. As such, each vortex generator of the set of vortex generators 230 is configured to create a vortex pair on opposing, or circumferentially opposing, sides of the vortex generator.

The vortex pairs are used to increase entrapment of the gaseous fuel that exits the set of gaseous fuel orifices 220 (e.g., the outlet flow of gaseous fuel (Fgo) of FIG. 4). Specifically, the outlet flow of gaseous fuel (Fgo) is captured by the outlet flow of compressed air (Fco) through use of at least the second outlet flow of compressed air (Fco2). The capturing of the outlet flow of gaseous fuel (Fgo), in turn, ensures that the outlet flow of gaseous fuel (Fgo) is adequately mixed with a flow of compressed air prior to being ignited. As used herein, the term 'adequately mixed" or "efficiently mixed" refers to how well two of more fluids are mixed together, with it being understood that the best resulting mixture of two fluid would be a homogenous mixture of the two or more fluids. In other words, one portion of the mixture does not include more of one fluid than another portion of the mixture. In terms of the fuel nozzle assembly 202, the resulting mixed flow of gaseous fuel and air (Fm) of FIG. 4 includes a flow of a mixture of fuel and air where the gaseous fuel is evenly distributed or more evenly distributed through the mixed flow of gaseous fuel and air (Fm) when compared to a fuel nozzle assembly not including the set of vortex generators 230.

It has been found that creating a more homogenous mixture of gaseous fuel and compressed air reduces $NO_x$ emissions from the combustion section 200. It is contemplated that if one section of the mixed flow of gaseous fuel and air (Fm) was richer (e.g. included a higher concentration of gaseous fuel) than another section, the richer section will produce increased $NO_x$ emissions. This, in turn, means that that a mixed flow of gaseous fuel and air (Fm) that is not adequately mixed, when combusted, will produce more $NO_x$ emissions when compared to the fuel nozzle assembly 202 that includes the mixed flow of gaseous fuel and air (Fm) that is adequately mixed due to the use of the set of vortex generators 230.

At least a portion of the gaseous fuel orifices of the set of gaseous fuel orifices 220 are circumferentially aligned with at least a portion of the set of vortex generators 230. This alignment, in turn, ensures that the outlet flow of gaseous fuel (Fgo) is injected directly into the opposing vortices (e.g., the second outlet flow of compressed air (Fco2)). The direct injection of the outlet flow of gaseous fuel (Fgo) into the vortex pairs ensures that the outlet flow of gaseous fuel (Fgo) is adequately mixed with the outlet flow of compressed air (Fco).

Figure 9:
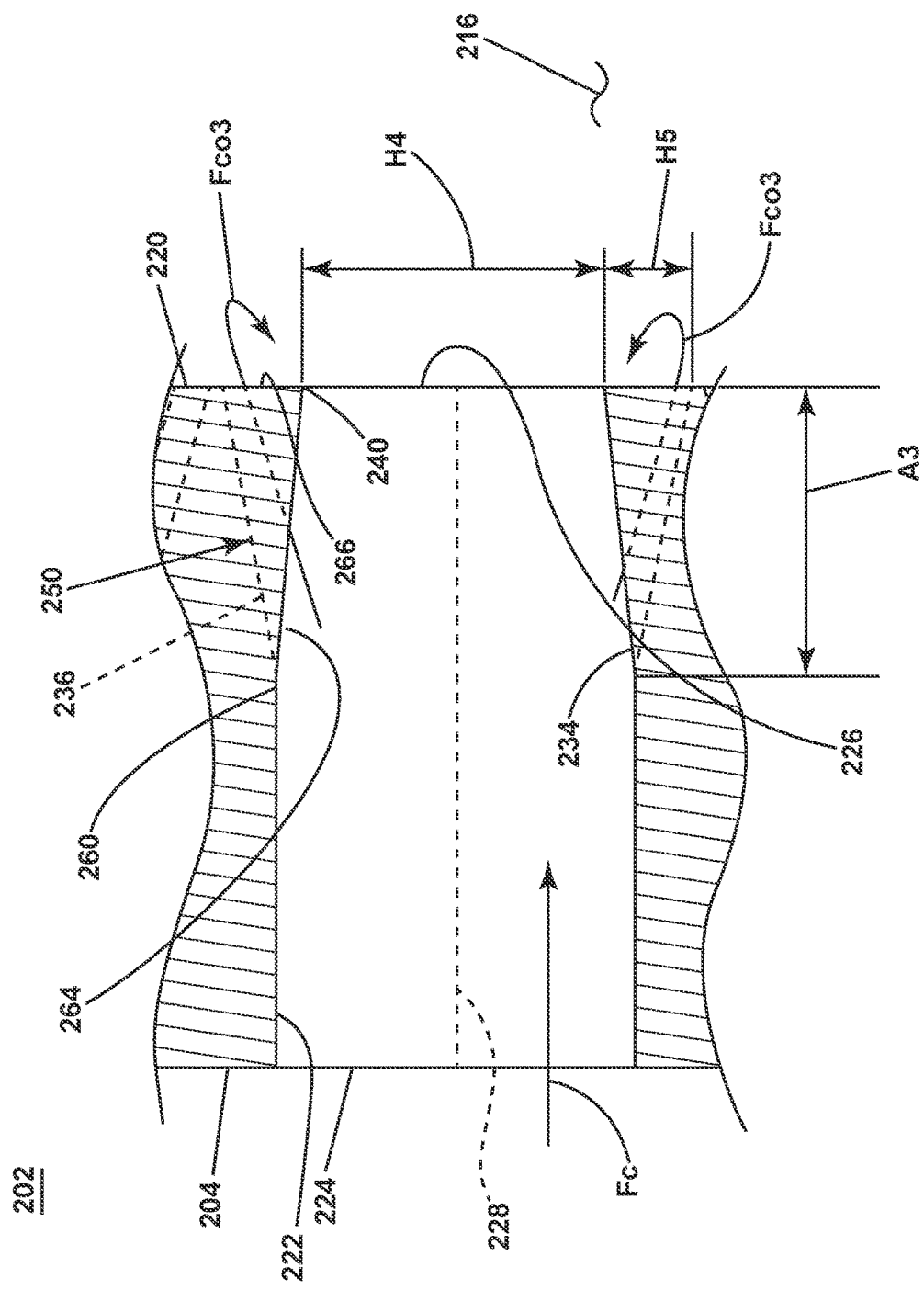
FIG. 9 is a schematic side cross-sectional view of the compressed air tube of the set of compressed air tubes taken along sectional line IX-IX of FIG. 5, further illustrating a portion of the compressed air tube including the set of second vortex generators.

FIG. 9 is a schematic side cross-sectional view of the compressed air tube 222 taken along sectional line IX-IX of FIG. 5. The compressed air tube 222 taken along sectional line IX-IX includes a portion of the set of vortex generators 230; specifically the set of second vortex generators 234. At least a portion of the set of gaseous fuel orifices 220, illustrated in phantom lines, can be circumferentially aligned with the set of second vortex generators 234

The compressed air outlet 226 extends radially, with respect to the tube centerline axis 228, a fourth radial height (H4). The fourth radial height (H4) is measured between opposing apexes 240 of opposing second vortex generators of the set of second vortex generators 234. Each second vortex generator of the set of second vortex generators 234 extends radially, with respect to the tube centerline axis 228, a fifth radial height (H5). Each second vortex generator of the set of second vortex generators 234 extends axially, with respect to the tube centerline axis 228, a third axial distance (A3) between the foot 260 and the apex 240. The fourth radial height (H4) can be less than, equal to, or greater than the fifth radial height (H5). With reference to FIGS. 6 and 9, the fourth radial height (H4) is less than the first radial height (H1). In other words, the set of vortex generators 230 radially constrict the compressed air tube 222 at the compressed air outlet 226.

During operation, the flow of compressed air (Fc) is fed to the compressed air tube 222. At least a portion of the flow of compressed air (Fc) flows over the set of second vortex generators 234 and out the compressed air outlet 226 as a third outlet flow of compressed air (Fco3). The third outlet flow of compressed air (Fco3) forms a portion of the outlet flow of compressed air (Fco) of FIG. 4. The set of vortex generators 230 are configured to direct the flow of compressed air (Fc) such that the third outlet flow of compressed air (Fco3) forms a vortex within the combustion chamber 216, similar to second outlet flow of compressed air (Fco2) of FIG. 7. Each second vortex generator of the set of second vortex generators 234 creates a vortex pair provided on opposing sides of the vortex generator.

Referring to FIGS. 5-7 and 9, at least one of the second axial distance (A2) or the third radial height (H3) is larger than the third axial distance (A3) or the fifth radial height (H5), respectively. In other words, the set of second vortex generators 234 are smaller than the set of first vortex generators 232. The variation between the set of first vortex generators 232 and the set of second vortex generators 234 results in a variation of the size of the vortices created by the respective vortex generator. The larger the vortex generator, the larger each vortex created by the vortex generator will be. As such, the set of first vortex generators 232 create larger vortices in comparison with the vortices of the set of second vortex generators 234. The variation between the size of the vortices is used to.

The set of vortex generators 230 can be defined by respective parameters with respect to one another. The first radial height (H1) is larger than both of the third radial height (H3) of the set of first vortex generators 232 and the fifth radial height (H5) of the set of second vortex generators 234. As a non-limiting example, the third radial height (H3) is greater than or equal to 0.01 times and less than or equal to 0.4 times the first radial height (H1) (e.g., 0.01*H1≤H3≤0.4*H1). As a non-limiting example, the fifth radial height (H5) is greater than or equal to 0.005 times and less than or equal to 0.4 times the first radial height (H1) (e.g., **0.001*H1≤H5≤0.4*H1**).

The first axial distance (A1) is larger than both of the second axial distance (A2) of the set of first vortex generators 232 and the third axial distance (A3) of the set of second vortex generators 234. As a non-limiting example, the second axial distance (A2) is greater than or equal to 0.3 times and less than or equal to 1 times the first axial distance (A1) (e.g., 0.3*A1≤A2≤A1). As a non-limiting example, the third axial distance (A3) is greater than or equal to 0.1 times and less than or equal to 1 times the first axial distance (A1) (e.g., 0.1*A1≤A3≤A1).

The first distance (L1) between a compressed air tubes 222 and an adjacent tube is greater than the first radial height (H1) of the compressed air tube 222. As a non-limiting example, the first axial distance (A1) can be greater than or equal to 1.1 times and less than or equal to 4 times the first distance (L1) (e.g., 1.1*L1≤A1≤4*L1). The first distance (L1) can be greater than or equal to 1.1 times and less than or equal to 4 times the first radial height (H1) (e.g., 1.1*H1≤L1≤4*H1).

The second radial height (H2) is less than the first radial height (H1). In other words, the set of vortex generators 230 radially constrict the compressed air tube 222 at the compressed air outlet 226. The pair of opposing side walls 238 can coverage at the foot 260. Alternatively, the leading edge 264 can be formed similar to the trailing edge 266 and include a triangular wall.

Figure 10:
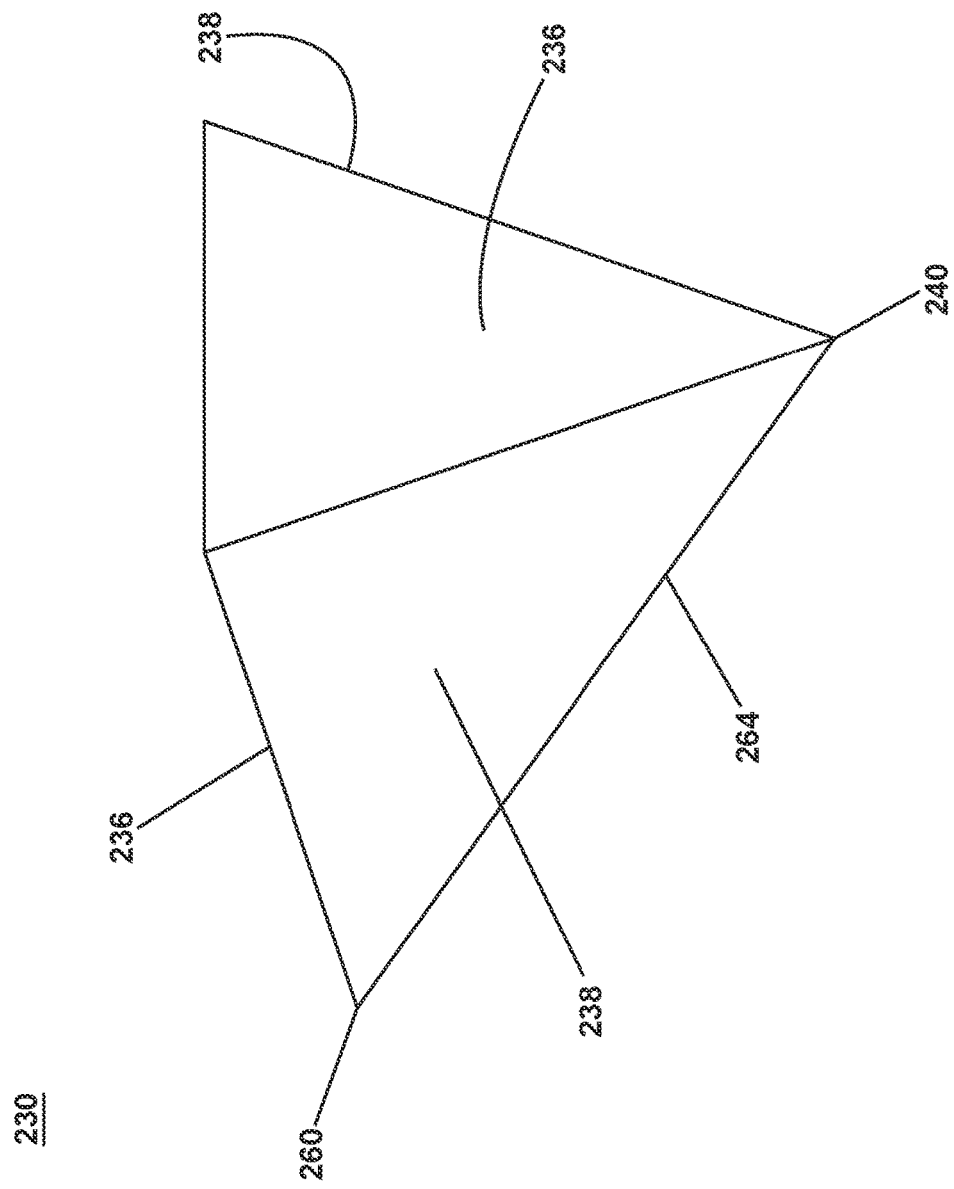
FIG. 10 is a schematic perspective view of a vortex generator of the set of vortex generators of FIG. 4, further illustrating a foot, an apex, a pair of opposing side walls, a trailing edge formed as a triangular wall.

FIG. 10 is a schematic perspective view of a vortex generator 230 of the set of vortex generators 230 of FIG. 4. The vortex generator 230 can be any one of the set of first vortex generators 232 (FIG. 5) or the set of second vortex generators 234 (FIG. 5). The vortex generator 230 is formed as an inverted pyramid converging at the apex 240. The trailing edge 266 can be formed as a triangular wall. In other words, the pair of opposing side walls 238 converge inwardly from the root 236 and to the leading edge 264 and apex 240. As such, the vortex generator 230 includes a triangular cross-section when viewed along a plane perpendicular to the tube centerline axis 228 (FIG. 4) and intersecting the vortex generator 230. While illustrated as an inverted pyramid, it will be appreciated that the vortex generator 230 can take any suitable three-dimensional polygonal shape. As such, the vortex generator 230 can include any suitable cross-section when viewed along the plane such as, but not limited to, a triangle, a rectangle, a trapezoid, or the like.

Figure 11:
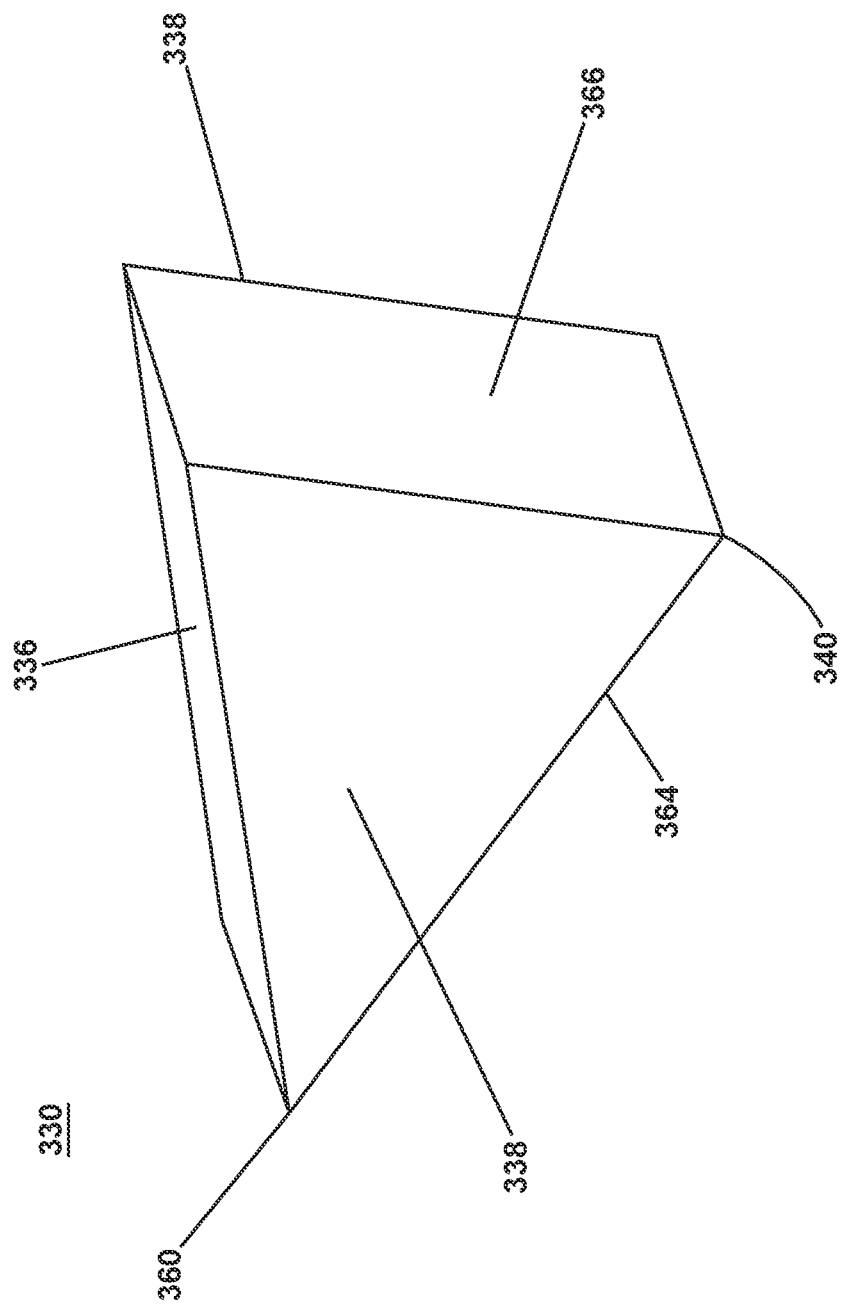
FIG. 11 is a schematic perspective view of an exemplary vortex generator suitable for use within the set of vortex generators of FIG. 4, further illustrating a foot, an apex, a pair of opposing side walls, and a trailing edge formed as a rectangular wall.

FIG. 11 is a schematic perspective view of an exemplary vortex generator 330 suitable for use within the set of vortex generators 230 of FIG. 4. The vortex generator 330 is similar to the set of vortex generators 230; therefore, like parts will be identified with like numerals increased to the 300 series with it being understood that the description of the set of vortex generators 230 applies to the vortex generator 330 unless noted otherwise.

The vortex generator 330 includes a root 336, an apex 340, a foot 360, and a pair of opposing side walls 338. The vortex generator 330 includes a leading edge 364 extending between the foot 360 and the apex 340.

The vortex generator 330 is similar to the vortex generator 230 (FIG. 10) in that the vortex generator is formed as a type of inverted pyramid. However, the vortex generator 330 instead includes a trailing edge 366. The trailing edge 366, unlike the tailing edge 266 (FIG. 10) can be formed as a rectangular wall. In other words, the pair of opposing side walls 338 extend from the root 236 and to the leading edge 364 and apex 240 without intersecting. As such, the vortex generator 330 includes a rectangular cross-section when viewed along a plane perpendicular to the tube centerline axis (e.g., the tube centerline axis 228 of FIG. 4) and intersecting the vortex generator 330. It will be appreciated that the leading edge 364 and the trailing edge 366 can be formed as any suitable polygonal wall.

Figure 12:
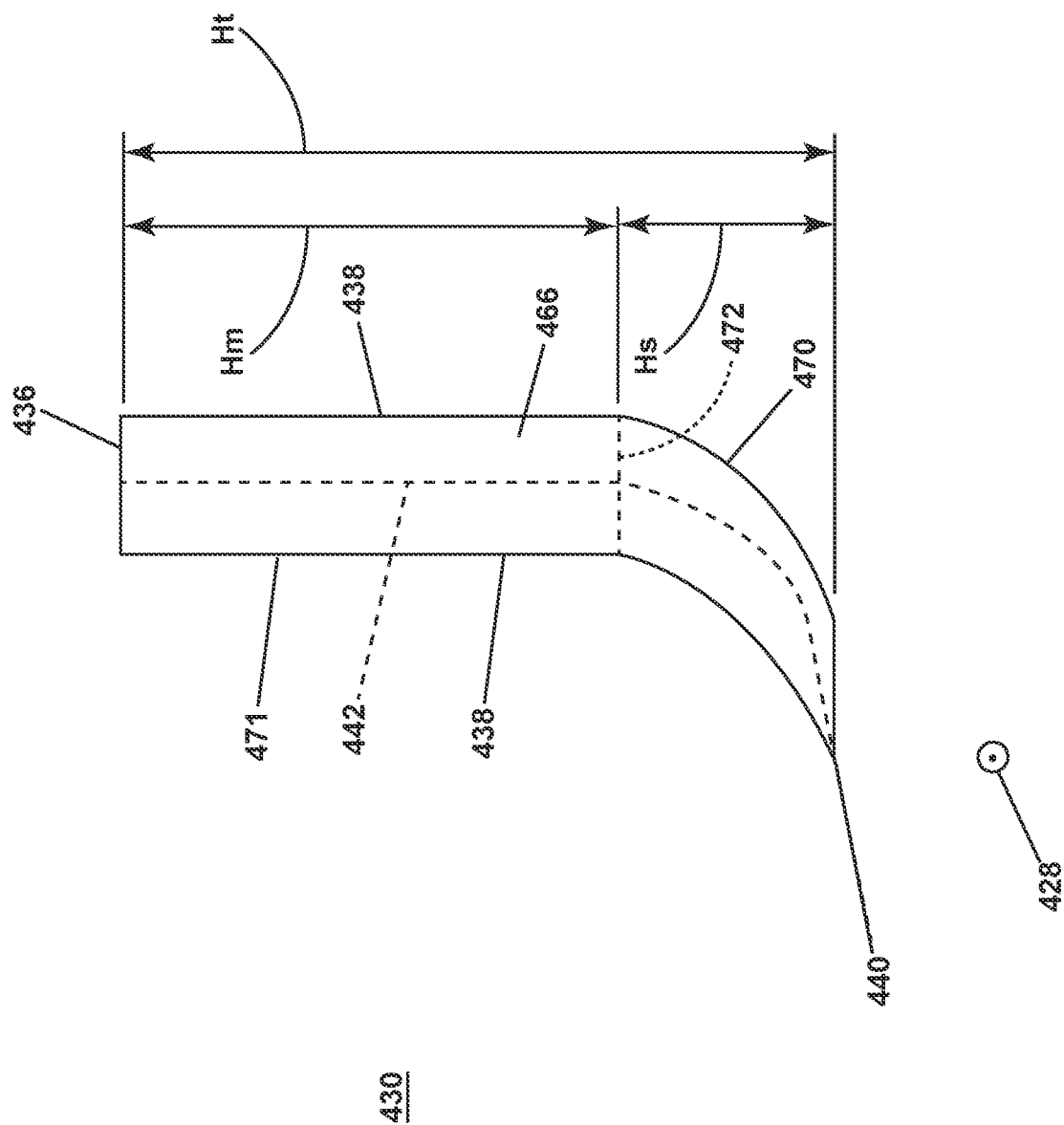
FIG. 12 is a schematic front view of an exemplary vortex generator suitable for use within the set of vortex generators of FIG. 4, further illustrating a swept section terminating at an apex.

FIG. 12 is a schematic perspective view of an exemplary vortex generator 430 suitable for use within the set of vortex generators 230 of FIG. 4. The vortex generator 430 is similar to the set of vortex generators 230, 330; therefore, like parts will be identified with like numerals increased to the 400 series with it being understood that the description of the set of vortex generators 230, 330 applies to the vortex generator 430 unless noted otherwise.

The vortex generator 430 includes a root 436, an apex 440, and a pair of opposing side walls 438. The vortex generator 430 includes a trailing edge 466 extending between the root 436 and the apex 440. The vortex generator 430 includes a vortex generator centerline axis 442 that extends from the apex 440 to a point on the root 436 midway between the opposing side walls 438. The vortex generator 430 can be provided within a compressed air tube (not illustrated) defining a tube centerline axis 428.

The vortex generator 430 is similar to the vortex generator 230 (FIG. 10), 330 (FIG. 11) in that it is used to impart a swirl on a flow of fluid flowing over the vortex generator 430. The vortex generator 430, however, includes a swept body 470 stemming from a main body 471 of the vortex generator 430. A transition 472 between the swept body 470 and the main body 471 is shown in phantom lines. The swept body 470 is defined as a portion of the vortex generator 430 that includes an edge that sweeps circumferentially with respect to the tube centerline axis 428 (e.g., the opposing side walls sweep in the circumferential direction).

The vortex generator 430, as a whole, extends a total radial height (Ht), with respect to the tube centerline axis 428, from the root 436 to the apex 440 (equal to the third radial height (H3) or the fifth radial height (H5) of FIGS. 7 and 8, respectively). The main body 471 extends a main body radial height (Hm), with respect to the tube centerline axis 428, from the transition 472 to the root 436. The main body radial height (Hm) can be greater than or equal to 0.1 times to less than or equal to 0.7 times the total radial height (Ht) (e.g., $0.1*Ht \leq Hm \leq 0.7*H5$). The swept body 470 extends a swept body radial height (Hs), with respect to the tube centerline axis 428, from the transition 472 to the apex 440. The swept body radial height (Hs) is greater than, equal to, or less than the main body radial height (Hm).

The sizing of, positioning of and formation of the swept body 470 is used to direct the flow of compressed air (e.g., the flow of compressed air (Fc) of FIG. 4) flowing over the vortex generator 430 to a desired location within the compressed air tube (e.g., the compressed air tube 222 of FIG. 4) that the vortex generator 430 is provided within. As a non-limiting example, the swept body 470 can impart a tangential momentum onto the flow of compressed air. The tangential momentum can direct the flow of compressed air towards a central area (e.g., the tube centerline axis 228 of FIG. 4) of the compressed air tube. The direction of the flow of compressed air towards the central area of the compressed air tube, in turn, carries the flow of gaseous fuel (e.g., the outlet flow of gaseous fuel (Fgo) of FIG. 4) towards the central area of the compressed air tube. The carrying the flow of gaseous fuel towards the central area, in turn, increases the penetration of the flow of gaseous fuel into the flow of compressed air, which ultimately increases the mixing efficiency of the flow of gaseous fuel and the compressed air.

Figure 13:
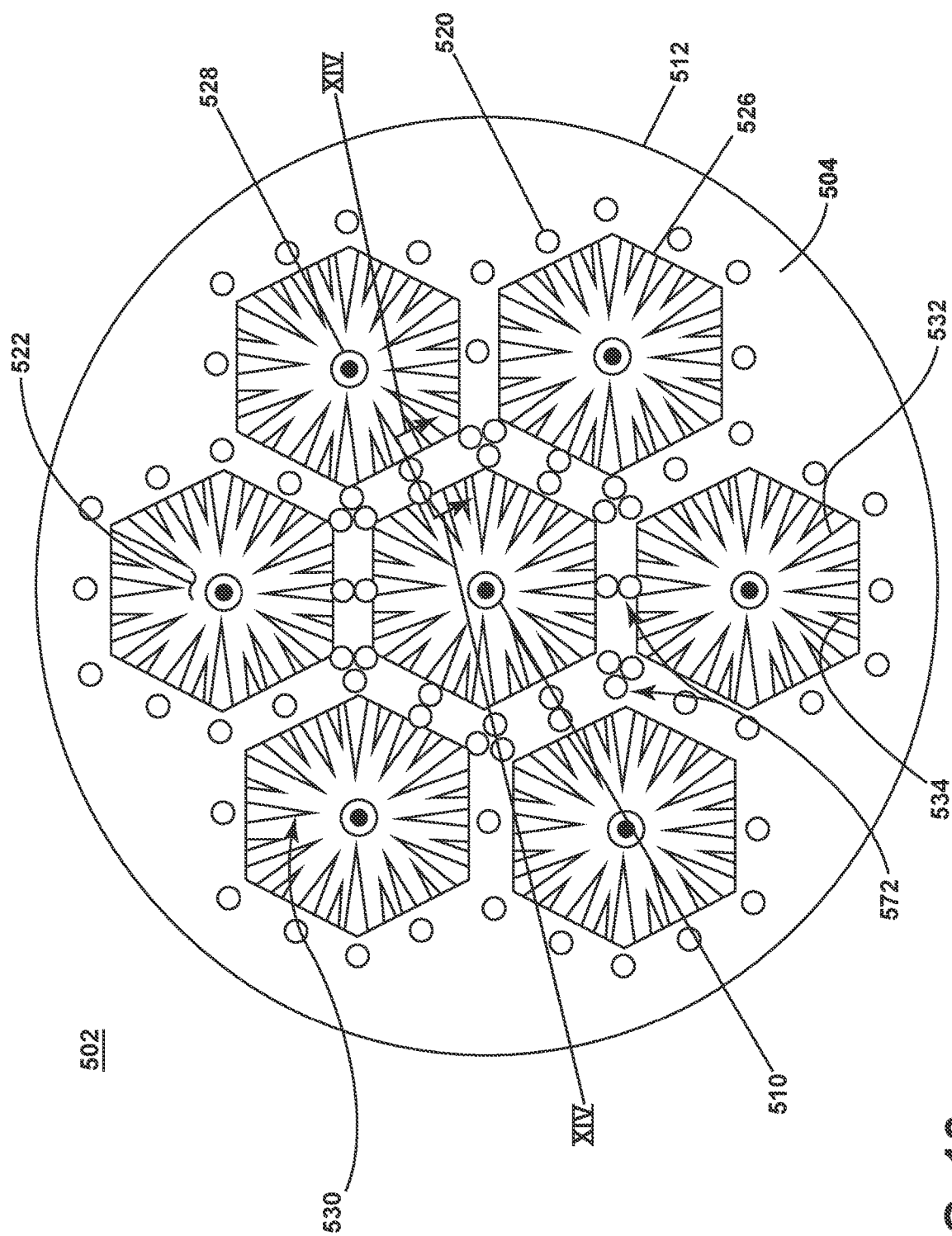
FIG. 13 is a schematic view of an exemplary fuel nozzle assembly suitable for use as the fuel nozzle assembly of FIG. 4, further illustrating a set of polygonal compressed air tubes and a set of gaseous fuel orifices including a set of gaseous fuel orifice clusters.

FIG. 13 is a schematic view of an exemplary fuel nozzle assembly 502 suitable for use as the fuel nozzle assembly 202 of FIG. 4. The fuel nozzle assembly 502 is similar to the fuel nozzle assembly 202; therefore, like parts will be identified with like numerals increased to the 500 series with it being understood that the description of the fuel nozzle assembly 202 applies to the fuel nozzle assembly 502 unless noted otherwise.

The fuel nozzle assembly 502 includes a head 504 and a body (e.g., the body 206 of FIG. 4). The body defines a gaseous fuel channel (e.g., the gaseous fuel channel 208 of FIG. 4) and a centerline axis 510. The head 504 includes a perimeter 512. The gaseous fuel channel terminates at a set of gaseous fuel orifices 520. The fuel nozzle assembly 502 includes a set of compressed air tubes 522 terminating at compressed air outlets 526. Each compressed air tube of the set of compressed air tubes 522 includes a tube centerline axis 528. The fuel nozzle assembly 502 includes a set of vortex generators 530 that can include any number of one or more sets of vortex generators. As a non-limiting example, the set of vortex generators 530 can include a set of first vortex generators 532 and a set of second vortex generators 534.

The fuel nozzle assembly 502 is similar to the fuel nozzle assembly 202 in that the set of gaseous fuel orifices 520 surround the set of compressed air tubes 522. The set of compressed air tubes 522 are not circular like the set of compressed air tubes 222 (FIG. 5). Instead, the set of compressed air tubes 522 are a non-circular polygon such as, but not limited to, a rectangle, a triangle, a hexagon, a trapezoid, or the like.

The set of gaseous fuel orifices 520 further include gaseous fuel orifice cluster 572 that include a plurality of gaseous fuel orifices 520 exhausting into separate, but adjacent, compressed air tubes 522. As a non-limiting example, a gaseous fuel orifice cluster 572 can include a total of three gaseous fuel orifices 520 at a location where three adjacent compressed air tubes 522 converge. It will be appreciated that the gaseous fuel orifice cluster 572 can be provided where adjacent compressed air tubes 522 converge. Alternatively, it will be appreciated that a single gaseous fuel orifice 520 can be provided exhausting into either or neither of the adjacent compressed air tubes 522.

Figure 14:
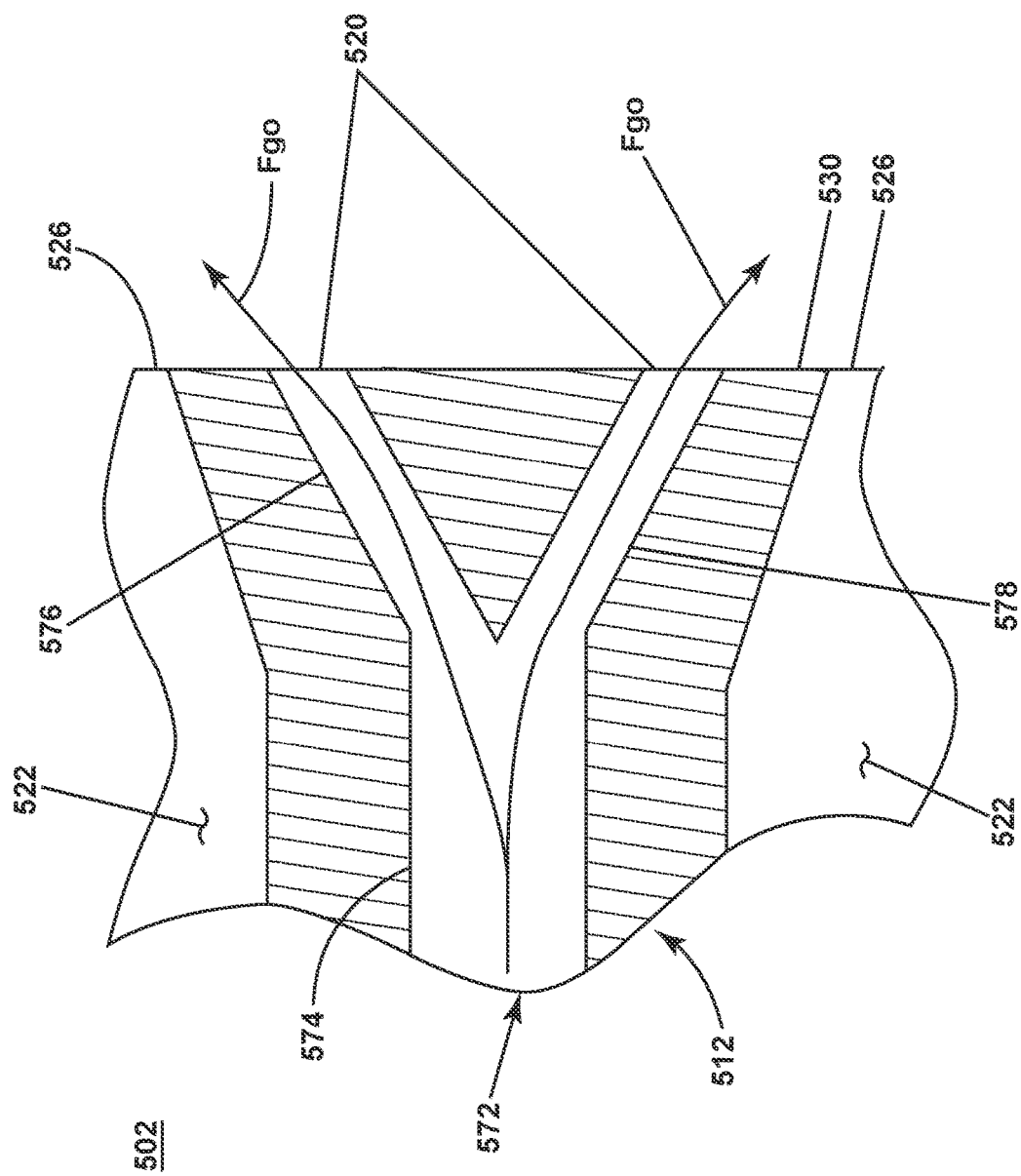
FIG. 14 is a schematic cross-sectional view of a fuel orifice cluster of the set of gaseous fuel orifice clusters taken along sectional line XIV-XIV of FIG. 13, further illustrating a main branch, a first leg and a second leg.

FIG. 14 is a schematic cross-sectional view of an exemplary gaseous fuel orifice cluster 572 taken along sectional line XIV-XIV of FIG. 12. The gaseous fuel orifice cluster 572 can include a main leg 574 that branches off into a first leg 576 and a second leg 578 and to the respective gaseous fuel orifice 520. The first leg 576 and the second leg 578 can each be oriented such that an outlet flow of gaseous fuel (Fgo) flowing through the respective first leg 576 or second leg 578 is directed towards an adjacent compressed air tubes 522.

Figure 15:
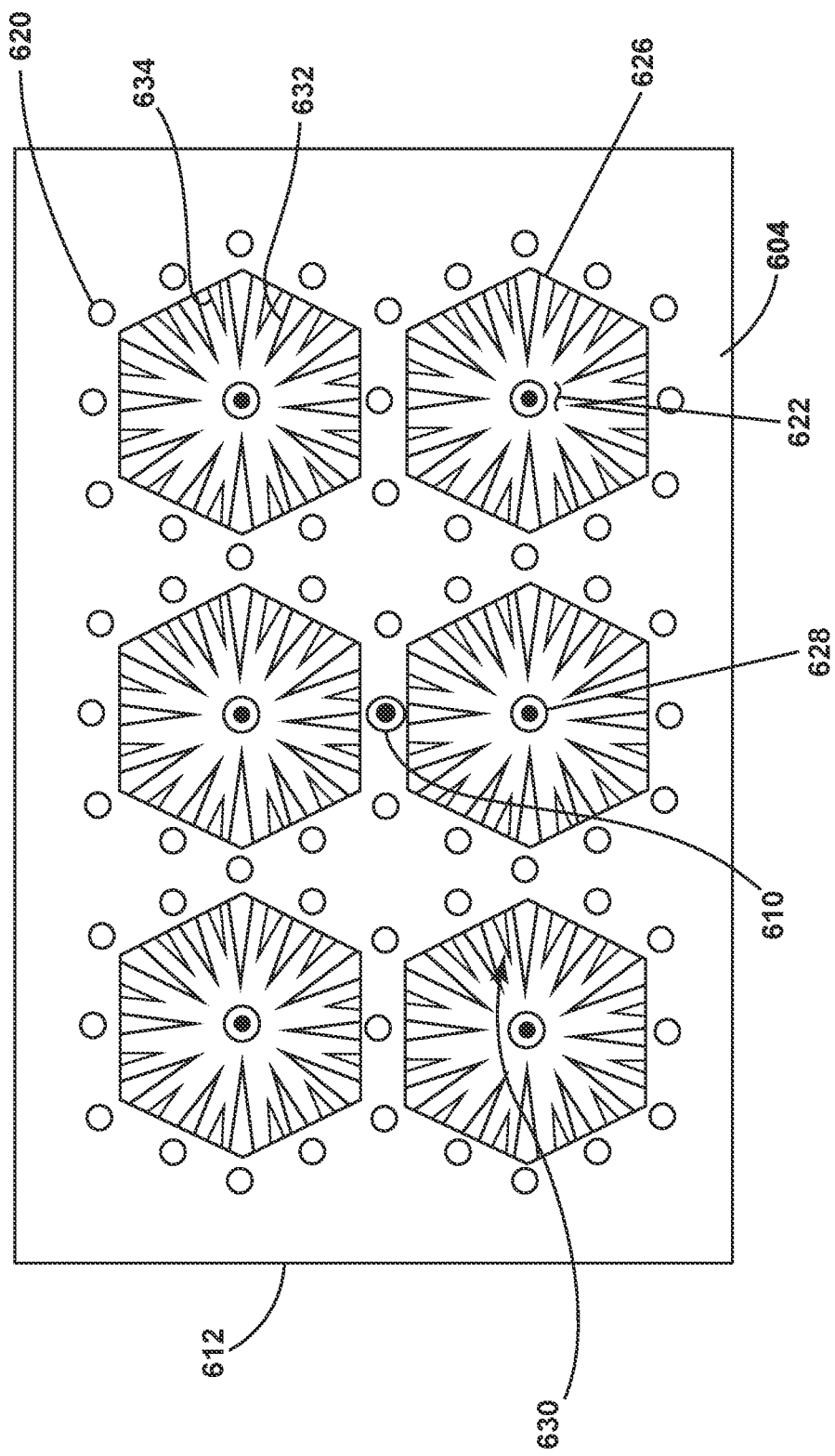
FIG. 15 is a schematic view of an exemplary fuel nozzle assembly suitable for use as the fuel nozzle assembly of FIG. 4, further illustrating a set of symmetric polygonal compressed air tubes and a set of gaseous fuel orifices.

FIG. 15 is a schematic view of an exemplary fuel nozzle assembly 602 suitable for use as the fuel nozzle assembly 202 of FIG. 4. The fuel nozzle assembly 602 is similar to the fuel nozzle assembly 202, 502; therefore, like parts will be identified with like numerals increased to the 600 series with it being understood that the description of the fuel nozzle assembly 202, 502 applies to the fuel nozzle assembly 602 unless noted otherwise.

The fuel nozzle assembly 602 includes a fuel nozzle assembly 602 having a head 604 and a body (e.g., the body 206 of FIG. 4). The body defines a gaseous fuel channel (e.g., the gaseous fuel channel 208 of FIG. 4) and a centerline axis 610. The head 604 includes a perimeter 612. The gaseous fuel channel terminates at a set of gaseous fuel orifices 620. The fuel nozzle assembly 602 includes a set of compressed air tubes 622 terminating at compressed air outlets 626. Each compressed air tube of the set of compressed air tubes 622 includes a tube centerline axis 628. The fuel nozzle assembly 602 includes a set of vortex generators 630 that can include any number of one or more sets of vortex generators. As a non-limiting example, the set of vortex generators 630 can include a set of first vortex generators 632 and a set of second vortex generators 634.

The head 604 is similar to the head 204 (FIG. 5), 504 (FIG. 13), in that it is defined by the perimeter 612. The perimeter 612, however, is a non-circular polygon. The non-circular polygon can be any suitable polygon such as, but not limited to, a triangle, a rectangle, a rhombus, a trapezoid, a hexagon, or the like. Further, like the compressed air tubes 522 (FIG. 13), the compressed air tubes 622 can be formed as a non-circular polygon shape. The compressed air tubes 622 can be formed in any suitable pattern. As a non-limiting example, the compressed air tubes 622 can be formed in two or more rows or columns. Further, the compressed air tubes 622 can be formed such that no tube centerline axis 628 is aligned with the centerline axis 610.

Figure 16:
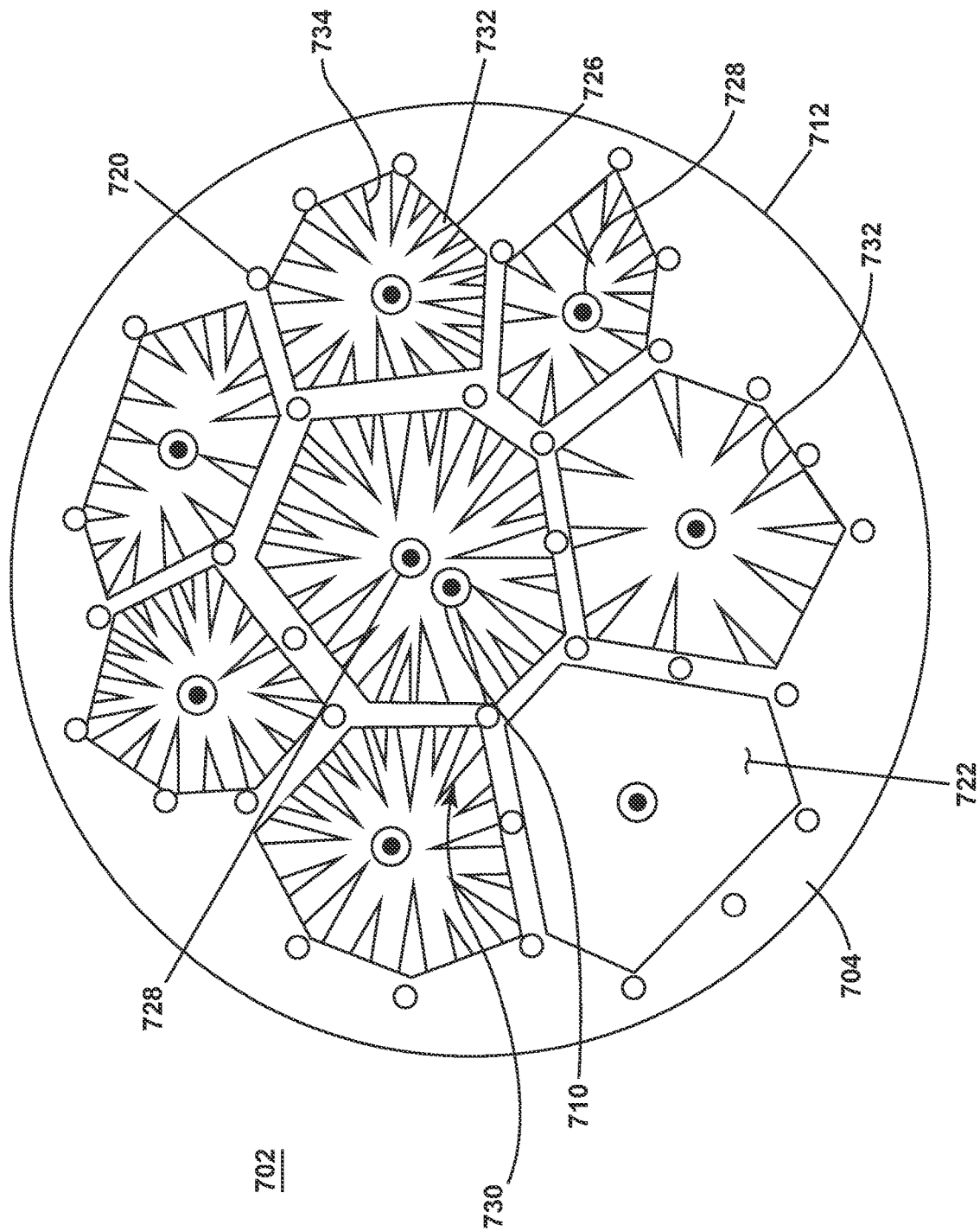
FIG. 16 is a schematic view of an exemplary fuel nozzle assembly suitable for use as the fuel nozzle assembly of FIG. 4, further illustrating a set of non-symmetric polygonal compressed air tubes and a set of gaseous fuel orifices.

FIG. 16 is a schematic view of an exemplary fuel nozzle assembly 702 suitable for use as the fuel nozzle assembly 202 of FIG. 4. The fuel nozzle assembly 702 is similar to the fuel nozzle assembly 202, 502, 602; therefore, like parts will be identified with like numerals increased to the 700 series with it being understood that the description of the fuel nozzle assembly 202, 502, 602 applies to the fuel nozzle assembly 702 unless noted otherwise.

The fuel nozzle assembly 702 includes a head 704 and a body (e.g., the body 206 of FIG. 4). The body defines a gaseous fuel channel (e.g., the gaseous fuel channel 208 of FIG. 4) and a centerline axis 710. The head 704 includes a perimeter 712. The gaseous fuel channel terminates at a set of gaseous fuel orifices 720. The fuel nozzle assembly 702 includes a set of compressed air tubes 722 terminating at compressed air outlets 726. Each compressed air tube of the set of compressed air tubes 722 includes a tube centerline axis 728. The fuel nozzle assembly 702 includes a set of vortex generators 730 that can include any number of one or more sets of vortex generators. As a non-limiting example, the set of vortex generators 730 can include a set of first vortex generators 732 and a set of second vortex generators 734.

The set of compressed air tubes 722 are similar to the set of set of compressed air tubes 222 (FIG. 5), 522 (FIG. 13), 622 (FIG. 15), except that at least a portion of the set of compressed air tubes 722 can be formed as non-symmetric polygons or shapes with respect to a plane extending along a tube centerline axis 728. Further, at least a portion of the compressed air tubes of the set of compressed air tubes 722 can be formed with all sets of vortex generators 730 (e.g., both of the set of first vortex generators 732 and the set of second vortex generators 734), a single set of vortex generators 730 (e.g., one of the set of first vortex generators 732 or the set of second vortex generators 734), or no sets of vortex generators 730 (e.g., neither of the set of first vortex generators 732 and the set of second vortex generators 734).

Benefits of the present disclosure include a combustor suitable for use with a gaseous H2 fuel. As outlined previously, gaseous H2 fuels have a higher flame temperature, likelihood for flashback and likelihood for auto-ignition than traditional fuels (e.g., fuels not containing hydrogen). That is, gaseous H2 fuels have a wider flammable range and a faster burning velocity than traditional fuels such petroleum-based fuels, or petroleum and synthetic fuel blends. These high burn temperatures of gaseous H2 fuels mean that additional insulation is needed between the ignited gaseous H2 fuel and surrounding components of the turbine engine or gas turbine engine (e.g., the dome wall, the inner/outer liner, and other parts of the turbine engine). Further, additional structure to mitigate flashback and stop undesired auto-ignition is needed; problems not faced by combustors utilizing traditional fuels. The combustor, as described herein, includes a fuel nozzle assembly that provides a layer of insulation between the flame and portions of the combustion section, keeps the mixed flow of fuel below the auto-ignition temperature, and prevents flashback from accruing within the fuel nozzle. The fuel nozzle assembly further aides in flame shaping which helps with ensuring liner wall temperature, the dome wall temperature, the combustor exit temperature profile and pattern of the flame/gas exiting the combustor can be controlled. This control or shaping can further ensure that the combustion section or otherwise hot sections of the turbine engine do not fail or otherwise become ineffective by being overly heated, thus increasing the lifespan of the turbine engine. That is, the fuel nozzle assembly, as described herein, ensure an even, uniform, or otherwise desired flame propagation within the combustor.

Further the use of the set of vortex generators, as opposed to a conventional fuel nozzle assembly that does not include the set of vortex generators, has been found to reduce $NO_x$ emissions from the combustion section. As discussed herein, the set of vortex generators create vortices within the combustion chamber that entrap or otherwise capture the flow of gaseous fuel that is being output into the combustion chamber. The entrapment of the flow of gaseous fuel, through the vortices, in turn helps with ensuring that the gaseous fuel and compressed air are adequately mixed. The use of the set of vortex generators help ensure that the mixture of compressed air and gaseous fuel is more homogenous (e.g., more efficiently mixed) than a mixture of compressed air and gaseous fuel of the conventional fuel nozzle assembly. The more homogenous mixture of compressed air and gaseous fuel, in turn, reduces the overall $NO_x$ emissions of the combustion section once the mixture of compressed air and gaseous fuel is ignited.

Benefits associated with using hydrogen-containing fuel over traditional fuels include an eco-friendlier engine as the hydrogen-containing fuel, when combusted, generates less carbon pollutants than a combustor using traditional fuels. For example, a combustor including 100% hydrogen-containing fuel (e.g., the fuel is 100% $H_2$) would have zero carbon pollutants. The combustor, as described herein, can be used in instances where 100% hydrogen-containing fuel is used.

To the extent not already described, the different features and structures of the various embodiments can be used in combination, or in substitution with each other as desired. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A turbine engine comprising a compression section, a combustion section, and a turbine section in serial flow arrangement, the combustion section comprising a dome wall and a combustor liner collectively forming at least a portion of a combustion chamber, and a fuel nozzle assembly, fluidly coupled to the combustion chamber, and comprising a compressed air tube having a compressed air outlet exhausting into the combustion chamber thereby supplying a flow of compressed air to the combustion chamber, the compressed air tube defining a tube centerline axis, a body defining a gaseous fuel channel exhausting into the combustion chamber at a set of gaseous fuel orifices thereby supplying a flow of gaseous fuel to the combustion chamber, the set of gaseous fuel orifices surrounding at least a portion of the compressed air outlet, and a set of vortex generators located within the compressed air tube, each vortex generator of the set of vortex generators defining a respective portion of the compressed air outlet and being configured to create a vortex pair defined by two vortices provided on opposing sides of the vortex generator, the vortex pair being used to capture the flow of gaseous fuel from the set of gaseous fuel orifices to define a mixture of compressed air and gaseous fuel within the combustion chamber.

The turbine engine of any preceding clause, wherein the set of gaseous fuel orifices are circumferentially spaced about the tube centerline axis and circumferentially aligned with at least a portion of the set of vortex generators.

The turbine engine of any preceding clause, wherein the set of vortex generators include a set of first vortex generators and a set of second vortex generators, different from the set of first vortex generators.

The turbine engine of any preceding clause, wherein each first vortex generator of the set of first vortex generators creates a first vortex pair, and each second vortex generator of the set of second vortex generators creates a second vortex pair, each second vortex of the second vortex pair being smaller than each first vortex of the first vortex pair.

The turbine engine of any preceding clause, wherein the compressed air tube extends a first axial length between a compressed air inlet formed along the body and the compressed air outlet, a first vortex generator of the set of vortex generators extends a second axial length, with respect to the tube centerline axis, that is greater than or equal to 0.1 times and less than or equal to 1 times the first axial length.

The turbine engine of any preceding clause, wherein a second vortex generator of the set of vortex generators extends a third axial length, with respect to the tube centerline axis, that is greater than or equal to 0.3 times and less than or equal to 1 times the first axial length.

The turbine engine of any preceding clause, wherein the second axial length is different from the third axial length.

The turbine engine of any preceding clause, wherein the compressed air outlet extends a first radial height, with respect to the tube centerline axis when viewed along a plane extending along the tube centerline axis and intersecting a portion of the compressed air tube not including the set of vortex generators, and a first vortex generator of the set of vortex generators extends a second radial height, with respect to the centerline axis, along a leading edge of the first vortex generator, with the second radial height being greater than or equal to 0.01 times and less than or equal to 0.4 times the first radial height.

The turbine engine of any preceding clause, wherein a second vortex generator of the set of vortex generators extends a third radial height, with respect to the centerline axis, along a leading edge of the first vortex generator, with the third radial height being greater than or equal to 0.005 times and less than or equal to 0.4 times the first radial height.

The turbine engine of any preceding clause, wherein the second radial height is non-equal to the third radial height.

The turbine engine of any preceding clause, wherein the compressed air tube is included within a set of compressed air tubes having a first compressed air tube and a second compressed air tube, adjacent to the first compressed air tube, with each compressed air tube having a respective subset of the set of gaseous fuel orifices surrounding at least a portion of the compressed air outlet.

The turbine engine of any preceding clause, wherein the compressed air outlet of the first compressed air tube extends a first radial height, with respect to the tube centerline axis when viewed along a plane extending along the tube centerline axis and intersecting a portion of the first compressed air tube not including the set of vortex generators, the tube centerline axis at the compressed air outlet of the first compressed air tube is provided a distance from the tube centerline axis at the compressed air outlet of the second compressed air tube, with the distance being greater than or equal to 1.1 times and less than or equal to 4 times the first radial height.

The turbine engine of any preceding clause, wherein the fuel nozzle assembly is symmetric about a plane extending along the centerline axis.

The turbine engine of any preceding clause, wherein at least one of the compressed air tubes of the compressed air tubes do not include the set of vortex generators.

The turbine engine of any preceding clause, wherein the set of gaseous fuel orifices include at least one gaseous fuel orifice cluster provided between at least two adjacent compressed air tubes of the set of compressed air tubes, the at least one gaseous fuel orifice cluster having a main leg, a first leg fluidly coupling the main leg to a first gaseous fuel orifice of the at least one gaseous fuel orifice cluster, the first gaseous fuel orifice exhausting into a first compressed air tube of the at least two adjacent compressed air tubes, and a second leg fluidly coupling the main leg to a second gaseous fuel orifice of the at least one gaseous fuel orifice cluster, the first gaseous fuel orifice exhausting into a second compressed air tube, different from the first compressed air tube, of the at least two adjacent compressed air tubes.

The turbine engine of any preceding clause, wherein a gaseous fuel orifice of the set of gaseous fuel orifices extends a radial width, with respect to the tube centerline axis, the gaseous fuel orifice is provided a radial height from the compressed air outlet, with respect to the tube centerline axis, the radial height being greater than or equal to 1.4 times and less than or equal to 20 times the radial width.

The turbine engine of any preceding clause, wherein each vortex generator of the set of vortex generators includes a root and an apex, and defines a vortex generator centerline extending from the apex to the root, and an included angle of greater than or equal to −60 degrees and less than or equal to 60 degrees with respect to a radial line extending from the tube centerline axis and intersecting the vortex generator centerline at the root.

The turbine engine of any preceding clause, wherein a vortex generator of the set of vortex generators includes a trailing edge, a main body and a swept body extending from the main body, the vortex generator extending a total radial height, with respect to the tube centerline axis, along the trailing edge and a main body radial height along the trailing edge, the main body radial height being greater than or equal to 0.1 times and less than or equal to 0.7 times the total radial height.

The turbine engine of any preceding clause, wherein the compressed air tube includes a non-circular polygonal shape when viewed along plane perpendicular to the tube centerline axis and intersecting the compressed air outlet.

A method of operating the combustion section of any preceding clause, the method comprising supplying a flow of gaseous hydrogen fuel to the gaseous fuel channel, and supplying a flow of compressed air to the set of compressed air tubes.

A combustion section comprising a dome wall and a combustor liner collectively forming at least a portion of a combustion chamber, and a fuel nozzle assembly, fluidly coupled to the combustion chamber, and comprising a compressed air tube having a compressed air outlet exhausting into the combustion chamber thereby supplying a flow of compressed air to the combustion chamber, the compressed air tube defining a tube centerline axis, a body defining a gaseous fuel channel exhausting into the combustion chamber at a set of gaseous fuel orifices thereby supplying a flow of gaseous fuel to the combustion chamber, the set of gaseous fuel orifices surrounding at least a portion of the compressed air outlet, and a set of vortex generators located within the compressed air tube, each vortex generator of the set of vortex generators defining a respective portion of the compressed air outlet and being configured to create a vortex pair defined by two vortices provided on opposing sides of the vortex generator, the vortex pair being used to capture the flow of gaseous fuel from the set of gaseous fuel orifices to define a mixture of compressed air and gaseous fuel within the combustion chamber.

The combustion section of any preceding clause, wherein set of gaseous fuel orifices are circumferentially spaced about the tube centerline axis and circumferentially aligned with at least a portion of the set of vortex generators.

The combustion section of any preceding clause, wherein the set of vortex generators include a set of first vortex generators and a set of second vortex generators, different from the set of first vortex generators.

The combustion section of any preceding clause, wherein each first vortex generator of the set of first vortex generators creates a first vortex pair, and each second vortex generator of the set of second vortex generators creates a second vortex pair, each second vortex of the second vortex pair being smaller than each first vortex of the first vortex pair.

The combustion section of any preceding clause, wherein the compressed air tube extends a first axial length between a compressed air inlet formed along the body and the compressed air outlet, a first vortex generator of the set of vortex generators extends a second axial length, with respect to the tube centerline axis, that is greater than or equal to 0.1 times and less than or equal to 1 times the first axial length.

The combustion section of any preceding clause, wherein a second vortex generator of the set of vortex generators extends a third axial length, with respect to the tube centerline axis, that is greater than or equal to 0.3 times and less than or equal to 1 times the first axial length.

The combustion section of any preceding clause, wherein the second axial length is different from the third axial length.

The combustion section of any preceding clause, wherein the compressed air outlet extends a first radial height, with respect to the tube centerline axis when viewed along a plane extending along the tube centerline axis and intersecting a portion of the compressed air tube not including the set of vortex generators, and a first vortex generator of the set of vortex generators extends a second radial height, with respect to the centerline axis, along a leading edge of the first vortex generator, with the second radial height being greater than or equal to 0.01 times and less than or equal to 0.4 times the first radial height.

The combustion section of any preceding clause, wherein a second vortex generator of the set of vortex generators extends a third radial height, with respect to the centerline axis, along a leading edge of the first vortex generator, with the third radial height being greater than or equal to 0.005 times and less than or equal to 0.4 times the first radial height.

The combustion section of any preceding clause, wherein the second radial height is non-equal to the third radial height.

The combustion section of any preceding clause, wherein the compressed air tube is included within a set of compressed air tubes having a first compressed air tube and a second compressed air tube, adjacent to the first compressed air tube, with each compressed air tube having a respective subset of the set of gaseous fuel orifices surrounding at least a portion of the compressed air outlet.

The combustion section of any preceding clause, wherein the compressed air outlet of the first compressed air tube extends a first radial height, with respect to the tube centerline axis when viewed along a plane extending along the tube centerline axis and intersecting a portion of the first compressed air tube not including the set of vortex generators, the tube centerline axis at the compressed air outlet of the first compressed air tube is provided a distance from the tube centerline axis at the compressed air outlet of the second compressed air tube, with the distance being greater than or equal to 1.1 times and less than or equal to 4 times the first radial height.

The combustion section of any preceding clause, wherein the fuel nozzle assembly is symmetric about a plane extending along the centerline axis.

The combustion section of any preceding clause, wherein at least one of the compressed air tubes of the compressed air tubes do not include the set of vortex generators.

The combustion section of any preceding clause, wherein the set of gaseous fuel orifices include at least one gaseous fuel orifice cluster provided between at least two adjacent compressed air tubes of the set of compressed air tubes, the at least one gaseous fuel orifice cluster having a main leg, a first leg fluidly coupling the main leg to a first gaseous fuel orifice of the at least one gaseous fuel orifice cluster, the first gaseous fuel orifice exhausting into a first compressed air tube of the at least two adjacent compressed air tubes, and a second leg fluidly coupling the main leg to a second gaseous fuel orifice of the at least one gaseous fuel orifice cluster, the first gaseous fuel orifice exhausting into a second compressed air tube, different from the first compressed air tube, of the at least two adjacent compressed air tubes.

The combustion section of any preceding clause, wherein a gaseous fuel orifice of the set of gaseous fuel orifices extends a radial width, with respect to the tube centerline axis, the gaseous fuel orifice is provided a radial height from the compressed air outlet, with respect to the tube centerline axis, the radial height being greater than or equal to 1.4 times and less than or equal to 20 times the radial width.

The combustion section of any preceding clause, wherein each vortex generator of the set of vortex generators includes a root and an apex, and defines a vortex generator centerline extending from the apex to the root, and an included angle of greater than or equal to −60 degrees and less than or equal to 60 degrees with respect to a radial line extending from the tube centerline axis and intersecting the vortex generator centerline at the root.

The combustion section of any preceding clause, wherein a vortex generator of the set of vortex generators includes a trailing edge, a main body and a swept body extending from the main body, the vortex generator extending a total radial height, with respect to the tube centerline axis, along the trailing edge and a main body radial height along the trailing edge, the main body radial height being greater than or equal to 0.1 times and less than or equal to 0.7 times the total radial height.

The combustion section of any preceding clause, wherein the compressed air tube includes a non-circular polygonal shape when viewed along plane perpendicular to the tube centerline axis and intersecting the compressed air outlet.

A method of operating the combustion section of any preceding clause, the method comprising supplying a flow of gaseous hydrogen fuel to the gaseous fuel channel, and supplying a flow of compressed air to the set of compressed air tubes.

What is claimed is:

1. A combustion section for a turbine engine comprising a compression section, the combustion section, and a turbine section in serial flow arrangement, the combustion section comprising:
   a dome wall and a combustor liner collectively forming at least a portion of a combustion chamber; and
   a fuel nozzle assembly, fluidly coupled to the combustion chamber, and comprising:
      a compressed air tube having a compressed air outlet exhausting into the combustion chamber thereby supplying a flow of compressed air to the combustion chamber, the compressed air tube defining a tube centerline axis;
      a body defining a gaseous fuel channel exhausting into the combustion chamber at a set of gaseous fuel orifices thereby supplying a flow of gaseous fuel to the combustion chamber, the set of gaseous fuel orifices surrounding at least a portion of the compressed air outlet; and
      a set of vortex generators located within the compressed air tube, the set of vortex generators configured to direct the flow of compressed air such that at least a portion of the flow of compressed air forms a set of vortices used to capture the flow of gaseous fuel from the set of gaseous fuel orifices to define a mixture of compressed air and gaseous fuel within the combustion chamber.

2. The combustion section of claim 1, wherein the set of gaseous fuel orifices are circumferentially spaced about the tube centerline axis and circumferentially aligned with at least a portion of the set of vortex generators.

3. The combustion section of claim 1, wherein the set of vortex generators include a set of first vortex generators and a set of second vortex generators, different from the set of first vortex generators.

4. The combustion section of claim 3, wherein:
   each first vortex generator of the set of first vortex generators creates a first vortex pair; and
   each second vortex generator of the set of second vortex generators creates a second vortex pair, each second vortex of the second vortex pair being smaller than each first vortex of the first vortex pair.

5. The combustion section of claim 1, wherein:
   the compressed air tube extends a first axial length between a compressed air inlet formed along the body and the compressed air outlet; and
   a first vortex generator of the set of vortex generators extends a second axial length, with respect to the tube centerline axis, that is greater than or equal to 0.1 times and less than or equal to 1 times the first axial length.

6. The combustion section of claim 5, wherein a second vortex generator of the set of vortex generators extends a third axial length, with respect to the tube centerline axis, that is greater than or equal to 0.3 times and less than or equal to 1 times the first axial length.

7. The combustion section of claim 6, wherein the second axial length is different from the third axial length.

8. The combustion section of claim 1, wherein:
   the compressed air outlet extends a first radial height, with respect to the tube centerline axis when viewed along a plane extending along the tube centerline axis and intersecting a portion of the compressed air tube not including the set of vortex generators; and
   a first vortex generator of the set of vortex generators extends a second radial height, with respect to the tube centerline axis, along a leading edge of the first vortex generator, with the second radial height being greater than or equal to 0.01 times and less than or equal to 0.4 times the first radial height.

9. The combustion section of claim 8, wherein a second vortex generator of the set of vortex generators extends a third radial height, with respect to the tube centerline axis, along a leading edge of the first vortex generator, with the third radial height being greater than or equal to 0.005 times and less than or equal to 0.4 times the first radial height.

10. The combustion section of claim 9, wherein the second radial height is non-equal to the third radial height.

11. The combustion section of claim 1, wherein the compressed air tube is included within a set of compressed air tubes having a first compressed air tube and a second compressed air tube, adjacent to the first compressed air tube, with each compressed air tube having a respective subset of the set of gaseous fuel orifices surrounding at least a portion of the compressed air outlet.

12. The combustion section of claim 11, wherein:
the compressed air outlet of the first compressed air tube extends a first radial height, with respect to the tube centerline axis when viewed along a plane extending along the tube centerline axis and intersecting a portion of the first compressed air tube not including the set of vortex generators; and
the tube centerline axis at the compressed air outlet of the first compressed air tube is provided a distance from the tube centerline axis at the compressed air outlet of the second compressed air tube, with the distance being greater than or equal to 1.1 times and less than or equal to 4 times the first radial height.

13. The combustion section of claim 11, wherein the fuel nozzle assembly is symmetric about a plane extending along the tube centerline axis.

14. The combustion section of claim 11, wherein at least one of the compressed air tubes of the compressed air tubes do not include the set of vortex generators.

15. The combustion section of claim 11, wherein the set of gaseous fuel orifices include at least one gaseous fuel orifice cluster provided between at least two adjacent compressed air tubes of the set of compressed air tubes, the at least one gaseous fuel orifice cluster having:
a main leg;
a first leg fluidly coupling the main leg to a first gaseous fuel orifice of the at least one gaseous fuel orifice cluster, the first gaseous fuel orifice exhausting into a first compressed air tube of the at least two adjacent compressed air tubes; and
a second leg fluidly coupling the main leg to a second gaseous fuel orifice of the at least one gaseous fuel orifice cluster, the first gaseous fuel orifice exhausting into a second compressed air tube, different from the first compressed air tube, of the at least two adjacent compressed air tubes.

16. The combustion section of claim 1, wherein:
a gaseous fuel orifice of the set of gaseous fuel orifices extends a radial width, with respect to the tube centerline axis; and
the gaseous fuel orifice is provided a radial height from the compressed air outlet, with respect to the tube centerline axis, the radial height being greater than or equal to 1.4 times and less than or equal to 20 times the radial width.

17. The combustion section of claim 1, wherein each vortex generator of the set of vortex generators includes a root and an apex, and defines a vortex generator centerline extending from the apex to the root, and an included angle of greater than or equal to −60 degrees and less than or equal to 60 degrees with respect to a radial line extending from the tube centerline axis and intersecting the vortex generator centerline at the root.

18. The combustion section of claim 1, wherein a vortex generator of the set of vortex generators includes a trailing edge, a main body and a swept body extending from the main body, the vortex generator extending a total radial height, with respect to the tube centerline axis, along the trailing edge and a main body radial height along the trailing edge, the main body radial height being greater than or equal to 0.1 times and less than or equal to 0.7 times the total radial height.

19. The combustion section of claim 1, wherein the compressed air tube includes a non-circular polygonal shape when viewed along plane perpendicular to the tube centerline axis and intersecting the compressed air outlet.

20. A method of operating the combustion section of claim 1, the method comprising:
supplying a flow of gaseous hydrogen fuel to the gaseous fuel channel; and
supplying a flow of compressed air to the set of compressed air tubes.

* * * * *